US011128365B2

United States Patent
Park et al.

(10) Patent No.: US 11,128,365 B2
(45) Date of Patent: *Sep. 21, 2021

(54) METHOD FOR TRANSMITTING AN UPLINK SIGNAL BASED ON A CODEBOOK IN A WIRELESS COMMUNICATION SYSTEM AND APPARATUS THEREFOR

(71) Applicant: LG Electronics Inc., Seoul (KR)

(72) Inventors: Haewook Park, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/786,348

(22) Filed: Feb. 10, 2020

(65) Prior Publication Data

US 2020/0177261 A1 Jun. 4, 2020

Related U.S. Application Data

(63) Continuation of application No. 16/124,550, filed on Sep. 7, 2018, now Pat. No. 10,601,485.

(Continued)

(51) Int. Cl.
*H04B 7/06* (2006.01)
*H04W 72/04* (2009.01)
(Continued)

(52) U.S. Cl.
CPC ......... *H04B 7/0639* (2013.01); *H04B 7/0478* (2013.01); *H04B 7/063* (2013.01);
(Continued)

(58) Field of Classification Search
CPC .... H04B 7/0639; H04B 7/0478; H04B 7/063; H04B 7/0404; H04L 1/1614;
(Continued)

(56) References Cited

U.S. PATENT DOCUMENTS 10,601,485 B2* 3/2020 Park .................. H04L 1/1614
2009/0080549 A1 3/2009 Khan
(Continued)

FOREIGN PATENT DOCUMENTS

| JP | 2012501151 | 1/2012 |
| KR | 101624119 | 5/2016 |
| WO | WO2018117738 | 6/2018 |

OTHER PUBLICATIONS

ZTE, "Codebook based UL transmission", R1-1712285, 3GPP TSG RAN WG1 Meeting #90, Prague, Czechia, Aug. 21-25, 2017, 7 pages.

(Continued)

*Primary Examiner* — Michael J Moore, Jr.
(74) *Attorney, Agent, or Firm* — Fish & Richardson P.C.

(57) ABSTRACT

This specification provides a method of transmitting an uplink signal based on a codebook in a wireless communication system. More specifically, the method performed by a UE includes receiving, from a base station, downlink control information (DCI) including a first transmit precoding matrix indicator (TPMI), determining a codebook subset related to the transmission of the uplink signal based on the first TPMI, and transmitting, to the base station, the uplink signal based on the determined codebook subset. Accordingly, there is an advantage in that flexibility in the transmission antenna design of a UE can be increased because the degree of freedom of antenna port selection is increased.

16 Claims, 13 Drawing Sheets

Related U.S. Application Data

(60) Provisional application No. 62/566,568, filed on Oct. 2, 2017, provisional application No. 62/555,607, filed on Sep. 7, 2017.

(51) Int. Cl.
| | |
|---|---|
| *H04L 27/26* | (2006.01) |
| *H04L 1/16* | (2006.01) |
| *H04B 7/0456* | (2017.01) |
| *H04W 52/34* | (2009.01) |
| *H04B 7/0404* | (2017.01) |
| *H04L 1/18* | (2006.01) |

(52) U.S. Cl.
CPC ........ *H04L 1/1614* (2013.01); *H04L 27/2627* (2013.01); *H04L 27/2636* (2013.01); *H04W 52/346* (2013.01); *H04W 72/0413* (2013.01); *H04B 7/0404* (2013.01); *H04L 1/1887* (2013.01)

(58) Field of Classification Search
CPC ............. H04L 27/2627; H04L 27/2636; H04L 1/1887; H04W 52/346; H04W 72/0413
See application file for complete search history.

(56) References Cited

U.S. PATENT DOCUMENTS

| | | | |
|---|---|---|---|
| 2011/0243079 A1 | 10/2011 | Chen | |
| 2012/0314678 A1 | 12/2012 | Ko | |
| 2013/0021897 A1 | 1/2013 | Wu | |
| 2013/0163687 A1 | 6/2013 | Jing | |
| 2014/0071952 A1 | 3/2014 | Kim | |
| 2014/0092850 A1 | 4/2014 | Ko et al. | |
| 2014/0119467 A1* | 5/2014 | Tee ...................... | H04B 7/0639 375/267 |
| 2014/0198868 A1 | 7/2014 | Yang | |
| 2014/0211873 A1 | 7/2014 | Park et al. | |
| 2014/0226702 A1* | 8/2014 | Onggosanusi ....... | H04B 7/0478 375/219 |
| 2014/0301492 A1 | 10/2014 | Xin | |
| 2015/0195024 A1 | 7/2015 | Kim et al. | |
| 2015/0304010 A1 | 10/2015 | Zhang et al. | |
| 2016/0149626 A1 | 5/2016 | Frenne | |
| 2016/0329937 A1 | 11/2016 | Shi | |
| 2016/0353290 A1 | 12/2016 | Nammi | |
| 2017/0141827 A1* | 5/2017 | Liu ........................ | H04B 7/06 |
| 2017/0250743 A1 | 8/2017 | Jongren | |
| 2017/0338868 A1* | 11/2017 | Wu ...................... | H04B 7/0417 |
| 2018/0183503 A1 | 6/2018 | Rahman | |
| 2018/0191410 A1* | 7/2018 | Liu ...................... | H04B 7/0658 |
| 2018/0205438 A1 | 7/2018 | Davydov | |
| 2019/0068256 A1* | 2/2019 | Muruganathan ..... | H04B 7/0626 |

OTHER PUBLICATIONS

CATT, "Discussion on codebook based UL MIMO transmission", R1-1712364, 3GPP TSG RAN WG1 Meeting #90, Prague, Czechia, Aug. 21-25, 2017, 6 pages.

VIVO, "Discussion on Multi-panel Multi-TRP Transmission for UL", R1-1712834, 3GPP TSG RAN WG1 Meeting #90, Prague, P.R. Czech, Aug. 21-25, 2017, 7 pages.

Qualcomm Incorporated, "Codebook based UL transmission", R1-1713387, 3GPP TSG RAN WG1 #90, Prague, Czech, Aug. 21-25, 2017, 6 pages.

Huawei, HiSilicon, "Codebook based transmission for UL MIMO", R1-1713766, 3GPP TSG RAN WG1 Meeting #90, Prague, Czech Republic, Aug. 21-25, 2017, 12 pages.

Extended European Search Report in European Appln. No. 18853314.5, dated May 20, 2020, 10 pages.

NTT Docomo, Inc., "Work plan for Rel-15 NR WI," R1-1713892, 3GPP TSG RAN WG1 Meeting #90, Prague, Czech Republic, Aug. 21-25, 2017, 101 pages.

United States Notice of Allowance in U.S. Appl. No. 16/124,550, dated Nov. 6, 2019, 9 pages.

United States Office Action in U.S. Appl. No. 16/124,550, dated Jun. 14, 2019, 16 pages.

Ericsson, "Summary of offline session on UL MIMO," Presented at 3GPP TSG-RAN WG1 #90, Prague, Czech Republic Aug. 21-25, 2017, 4 pages.

JP Office Action in Japanese Appln. No. 2020-513763, dated Jul. 6, 2021, 6 pages (with English translation).

LG Electronics, "Discussion on codebook based transmission for UL," Presented at 3GPP TSG RAN WG1 NR Ad-Hoc#2, Qingdao, P.R. China Jun. 27-30, 2017, 5 pages.

MediaTek Inc., "Codebook based transmission for UL, " Presented at 3GPP TSG RAN WG1 Meeting #90, Prague, Czech, Aug. 21-25, 2017, 7 pages.

CN Office Action in Chinese Appln. No. 201880056885.3, dated Jul. 14, 2021, 10 pages (with English translation).

* cited by examiner

METHOD FOR TRANSMITTING AN UPLINK SIGNAL BASED ON A CODEBOOK IN A WIRELESS COMMUNICATION SYSTEM AND APPARATUS THEREFOR

CROSS-REFERENCE TO RELATED APPLICATIONS

This application claims priority to U.S. patent application Ser. No. 16/124,550, filed Sep. 7, 2018, which claims the benefit of Provisional Application No. 62/555,607 filed Sep. 7, 2017 and No. 62/566,568 filed on Oct. 2, 2017 in US, the entire contents of which is hereby incorporated by reference in its entirety.

BACKGROUND OF THE INVENTION

Field of the Invention

This specification relates to a wireless communication system and, more particularly, to a method of transmitting an uplink signal based on a codebook and an apparatus supporting the same.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

This specification provides a method of configuring a codebook for a specific number of port selections.

Technical objects to be achieved in the present invention are not limited to the aforementioned technical objects, and other technical objects not described above may be evidently understood by a person having ordinary skill in the art to which the present invention pertains from the following description.

This specification provides a method of transmitting an uplink signal based on a codebook in a wireless communication system.

Specifically, the method performed by a UE includes receiving, from a base station, downlink control information (DCI) including a first transmit precoding matrix indicator (TPMI), determining a codebook subset related to the transmission of the uplink signal based on the first TPMI, and transmitting, to the base station, the uplink signal based on the determined codebook subset. The codebook subset is included in a codebook for a rank 1 using four antenna ports, and the codebook subset includes at least one codeword for selecting one antenna port.

Furthermore, in this specification, the at least one codeword is $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix} \text{ and } \frac{1}{2}\begin{bmatrix}0\\0\\0\\1\end{bmatrix}.$$

Furthermore, in this specification, the codebook for a rank 1 using the one antenna ports includes a codebook based on discrete Fourier transform spread orthogonal frequency division multiplexing (DFT-s-OFDM).

Furthermore, in this specification, the DCI further includes a second TPMI related to port combining of an antenna port selected based on the first TPMI.

Furthermore, in this specification, the size of the second TPMI is determined based on the size of the first TPMI.

Furthermore, in this specification, the first TPMI is represented as an X-bitmap, and a value of the X is the number of antenna ports.

Furthermore, in this specification, the first TPMI includes a wideband TPMI.

Furthermore, in this specification, the method further includes receiving, from the base station, a signaling including a power scaling factor to be applied to the at least one codeword and applying the power scaling factor to the at least one codeword.

Furthermore, in this specification, the power scaling factor is configured by considering the capability of the UE.

Furthermore, this specification, a user equipment (UE) transmitting an uplink signal based on a codebook in a wireless communication system includes a radio frequency (RF) module configured to transmit and receive radio signals and a processor functionally connected to the RF module. The processor is configured to receive, from a base station, downlink control information (DCI) including a first transmit precoding matrix indicator (TPMI), determine a codebook subset related to the transmission of the uplink signal based on the first TPMI, and transmit, to the base station, the uplink signal based on the determined codebook subset. The codebook subset is included in a codebook for a rank 1 using four antenna ports, and the codebook subset includes at least one codeword for selecting one antenna port.

BRIEF DESCRIPTION OF THE DRAWINGS

The accompanying drawings included as part of the detailed description in order to help understanding of the present invention provide embodiments of the present invention, and describe the technical characteristics of the present invention along with the detailed description.

DESCRIPTION OF EXEMPLARY EMBODIMENTS

Figure 1:
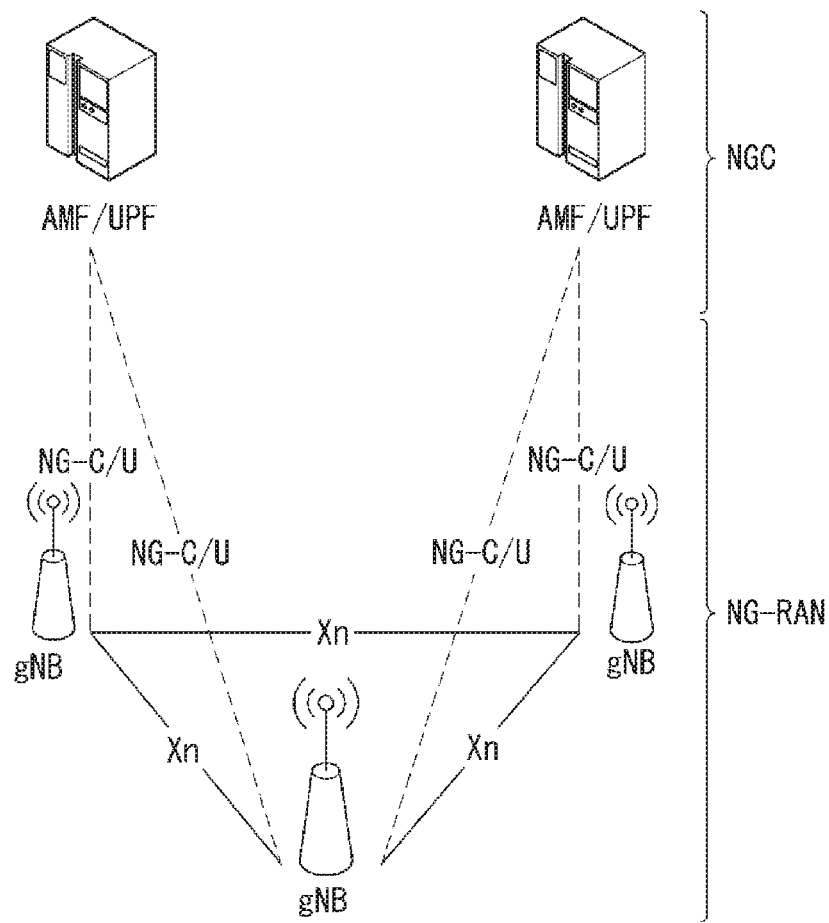
FIG. 1 is a diagram showing an example of an overall system structure of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC.

New RAN: A radio access network that supports NR or E-UTRA or interacts with an NGC.

Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC.

NG-U: A user plane interface used for NG3 reference point between new RAN and an NGC.

Non-standalone NR: A deployment configuration in which a gNB requires an LTE eNB as an anchor for a control plane connection to an EPC or requires an eLTE eNB as an anchor for a control plane connection to an NGC.

Non-standalone E-UTRA: A deployment configuration an eLTE eNB requires a gNB as an anchor for a control plane connection to an NGC.

User plane gateway: A terminal point of NG-U interface.

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE.

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and cyclic prefix (CP) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}$ and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
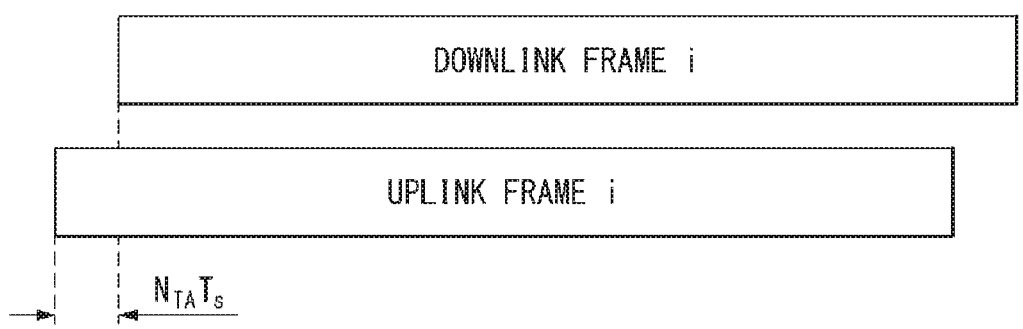
FIG. 2 shows a relation between an uplink frame and a downlink frame in a wireless communication system to which a method proposed in this specification may be applied.

FIG. 2 illustrates a relationship between a UL frame and a DL frame in a wireless communication system to which a method proposed by the present disclosure may be implemented.

As illustrated in FIG. 2, a UL frame number I from a user equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots, \mu}-1\}$ in a subframe, and in ascending order of $n_{s,f}^\mu \in \{0, \ldots, N_{subframe}^{slots, \mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | | Slot configuration | | | | |
| | | 0 | | | 1 | |
| μ | $N_{symb}^\mu$ | $N_{frame}^{slots\mu}$ | $N_{subfram}^{slots\mu}$ | $N_{symb}^\mu$ | $N_{frame}^{slots\mu}$ | $N_{subfram}^{slots\mu}$ |
|---|---|---|---|---|---|---|
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | | Slot configuration | | | | |
| | | 0 | | | 1 | |
| μ | $N_{symb}^\mu$ | $N_{frame}^{slots\mu}$ | $N_{subfram}^{slots\mu}$ | $N_{symb}^\mu$ | $N_{frame}^{slots\mu}$ | $N_{subfram}^{slots\mu}$ |
|---|---|---|---|---|---|---|
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
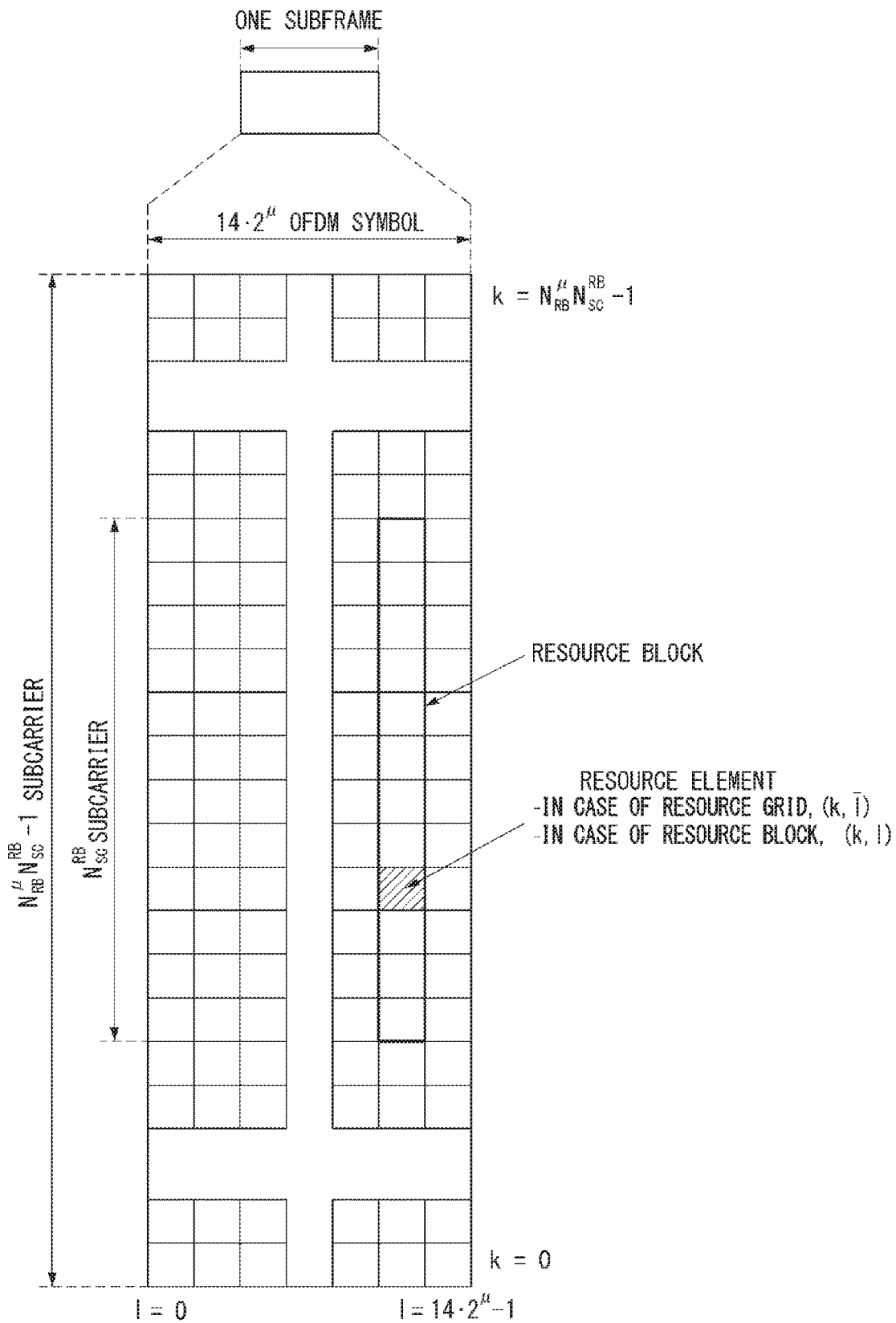
FIG. 3 shows an example of a resource grid supported in a wireless communication system to which a method proposed in this specification may be applied.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols Herein, $N_{RB}^{\mu} \leq N_{RB}^{max,\ \mu}$. The above $N_{RB}^{max,\ \mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l). Herein, $k=0, \ldots, N_{RB}^{\mu} N_{sc}^{RB}-1$ is an index in the frequency domain, and $l=0, \ldots, 2^{\mu} N_{symb}^{(\mu)}-1$ indicates a location of a symbol in a subframe. To indicate a resource element in a slot, the index pair (k,l) is used. Herein, $l=0, \ldots, N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

Figure 4:
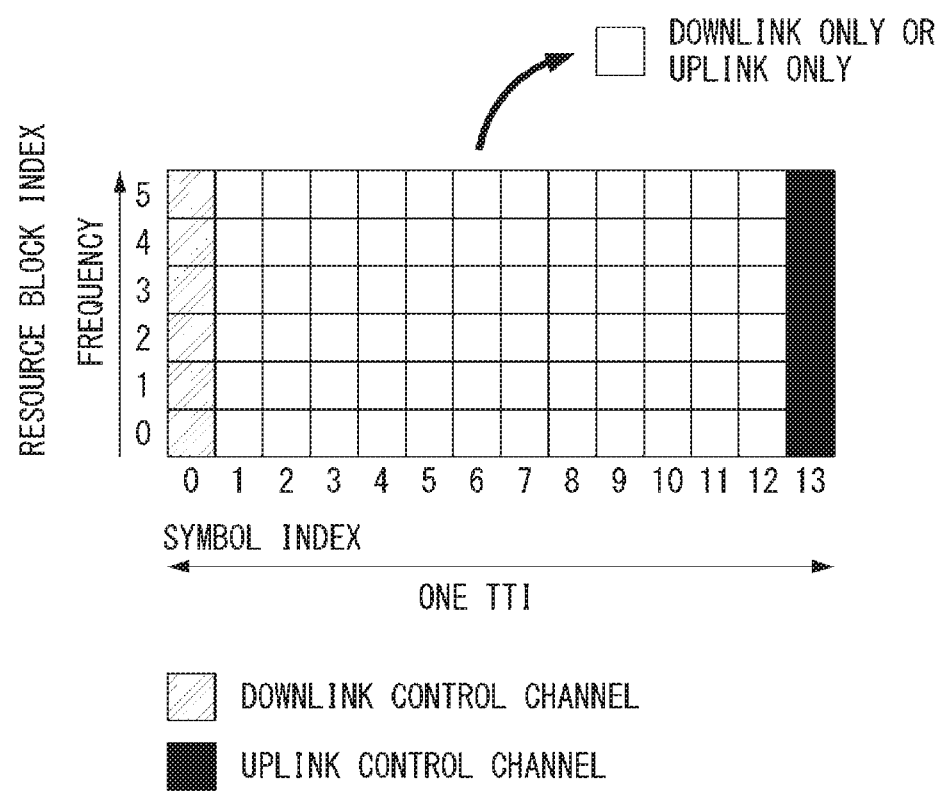
FIG. 4 shows an example of a self-contained sub-frame structure to which a method proposed in this specification may be applied.

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

Hybrid BF may be considered, which is an intermediate between digital BF and analog BF and has the number of TXRUs B less than the number of antenna elements Q. In this case, although varying depending upon a method of connecting the number of TXRU B and the number of antenna elements Q, beam directions capable of being transmitted at the same time are restricted to be less than B.

Hereinafter, typical examples of a method of connecting TXRUs and antenna elements will be described with reference to drawings.

Figure 5A:
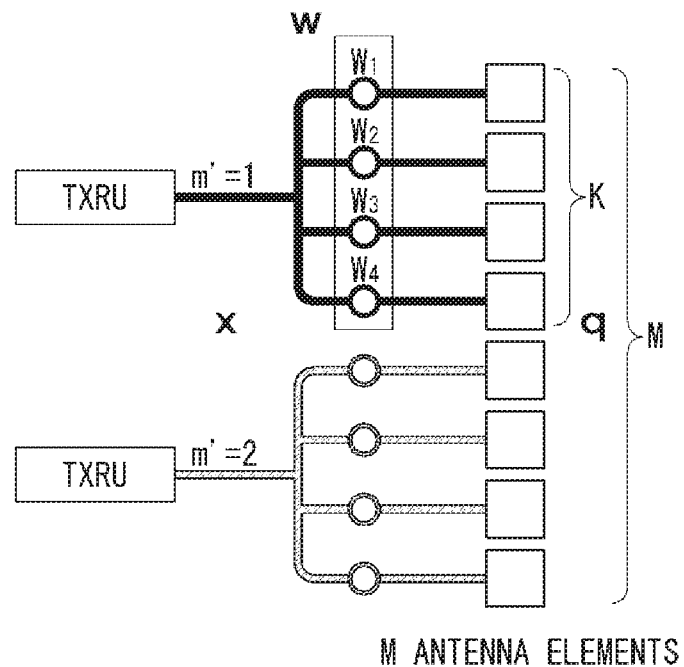
FIGS. 5A and 5B illustrate an example of a transceiver unit model in a wireless communication system to which the present invention may be applied.
Figure 5B:
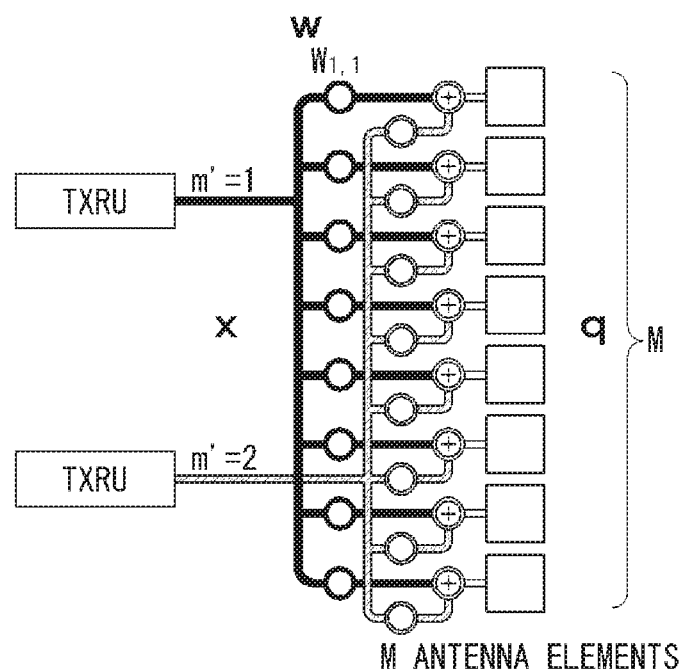

FIGS. 5A and 5B are an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5A, or as a TXRU virtualization model option-2: full-connection model.

Referring to FIG. 5A, in the sub-array partition model, the antenna elements are divided into multiple antenna element groups, and each TXRU may be connected to one of the multiple antenna element groups. In this case, the antenna elements are connected to only one TXRU.

Referring to FIG. 5B, in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIGS. 5A and 5B, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIGS. 5A and 5B is merely an example, and the present disclosure is not limited thereto and may be equivalently applied even to mapping of TXRUs and antenna elements which can be implemented in a variety of hardware forms.

Furthermore, in the new RAT system, if multiple antennas are used, a hybrid beamforming scheme in which digital beamforming and analog beamforming have been combined is emerging.

In this case, the analog beamforming (or radio frequency (RF) beamforming) means an operation for an RF stage to perform precoding (or combining). In the hybrid beamforming, each of a baseband stage and an RF stage performs precoding (or combining). Accordingly, there are advantages in that the number of RF chains and the number of digital (D)/analog (A) (or A/D) converters are reduced and performance closer to that of digital beamforming can be achieved.

For convenience sake, a hybrid beamforming structure may be expressed as N transceiver units (TXRU) and M physical antennas. In this case, digital beamforming for L data layers to be transmitted by a transmission stage may be expressed as an N by L matrix. Thereafter, converted N digital signals are converted into an analog signal via the TXRU, and analog beamforming expressed in an M by N matrix is then applied to the analog signal.

Figure 6:
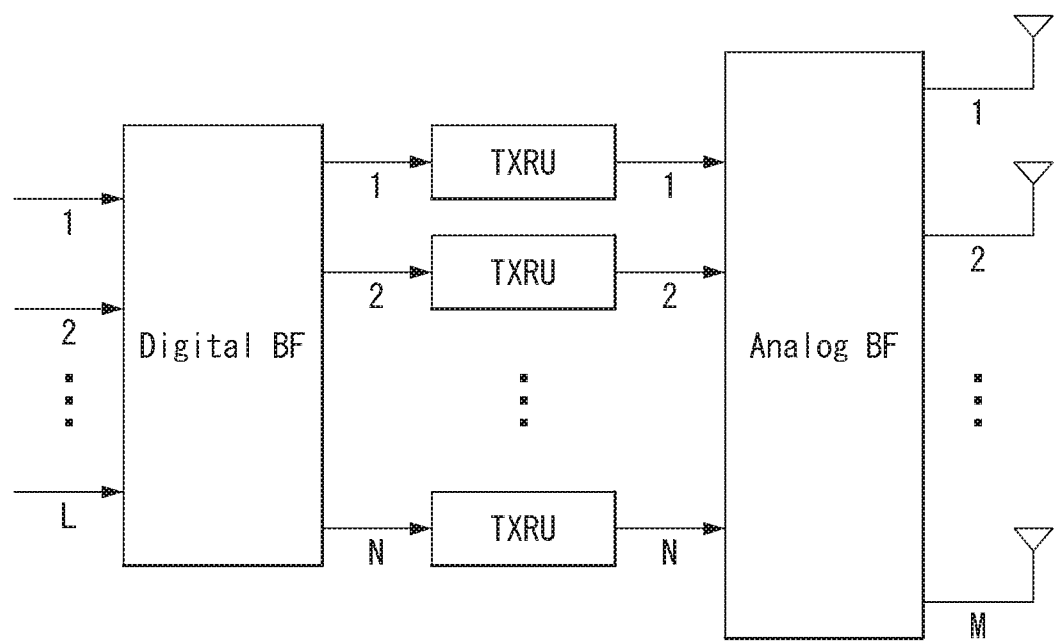
FIG. 6 is a diagram showing a hybrid beamforming structure in a TXRU and physical antenna viewpoint in a wireless communication system to which the present invention may be applied.

FIG. 6 is a diagram showing a hybrid beamforming structure in the TXRU and physical antenna viewpoint in a wireless communication system to which the present invention may be applied.

FIG. 6 illustrates a case where the number of digital beams is L and the number of analog beams is N.

The new RAT system is designed so that a base station can change analog beamforming in units of symbol in order to support more efficient beamforming for a UE positioned in a specific area. Furthermore, when specific N TXRUs and M RF antennas are defined as one antenna panel in FIG. 6, a method of introducing a plurality of antenna panels to which independent hybrid beamforming can be applied is taken into consideration in the new RAT system.

Channel State Information (CSI) Feedback

In the 3GPP LTE/LTE-A system, a user equipment (UE) has been defined to report channel state information (CSI) to a base station (BS or eNB).

CSI collectives indicates information capable of indicating quality of a radio channel (or also called a link) formed between a UE and an antenna port. For example, a rank indicator (RI), a precoding matrix indicator (PMI) or a channel quality indicator (CQI) corresponds to CSI.

In this case, the RI indicates rank information of a channel and means the number of streams received by a UE through the same time-frequency resource. This value is determined depending on the long term fading of a channel, so the RI has a longer period than a PMI or CQI and is fed back from a UE to a BS. The PMI is a value into which a channel space characteristic has been incorporated, and indicates a precoding index preferred by a UE based on metric, such as a signal-to-interference-plus-noise ratio (SINR). The CQI is a value indicative of the intensity of a channel and means a received SINR that may be obtained when a BS uses a PMI.

In the 3GPP LTE/LTE-A system, a BS configures multiple CSI processes for a UE and may receive CSI reporting for each process. In this case, the CSI process includes a CSI-RS for signal quality measurement from a BS and a CSI-interference measurement (CSI-IM) resource for interference measurement.

Reference Signal (RS) Virtualization

In mmW, a PDSCH may be transmitted in one analog beam direction only at one occasion through analog beamforming. In this case, data transmission may be possible from a BS to only some UEs in the corresponding direction. Accordingly, data transmission may be performed on multiple UEs in several analog beam directions at the same time by differently configuring the analog beam directions on an antenna port basis, if necessary.

Figure 7:
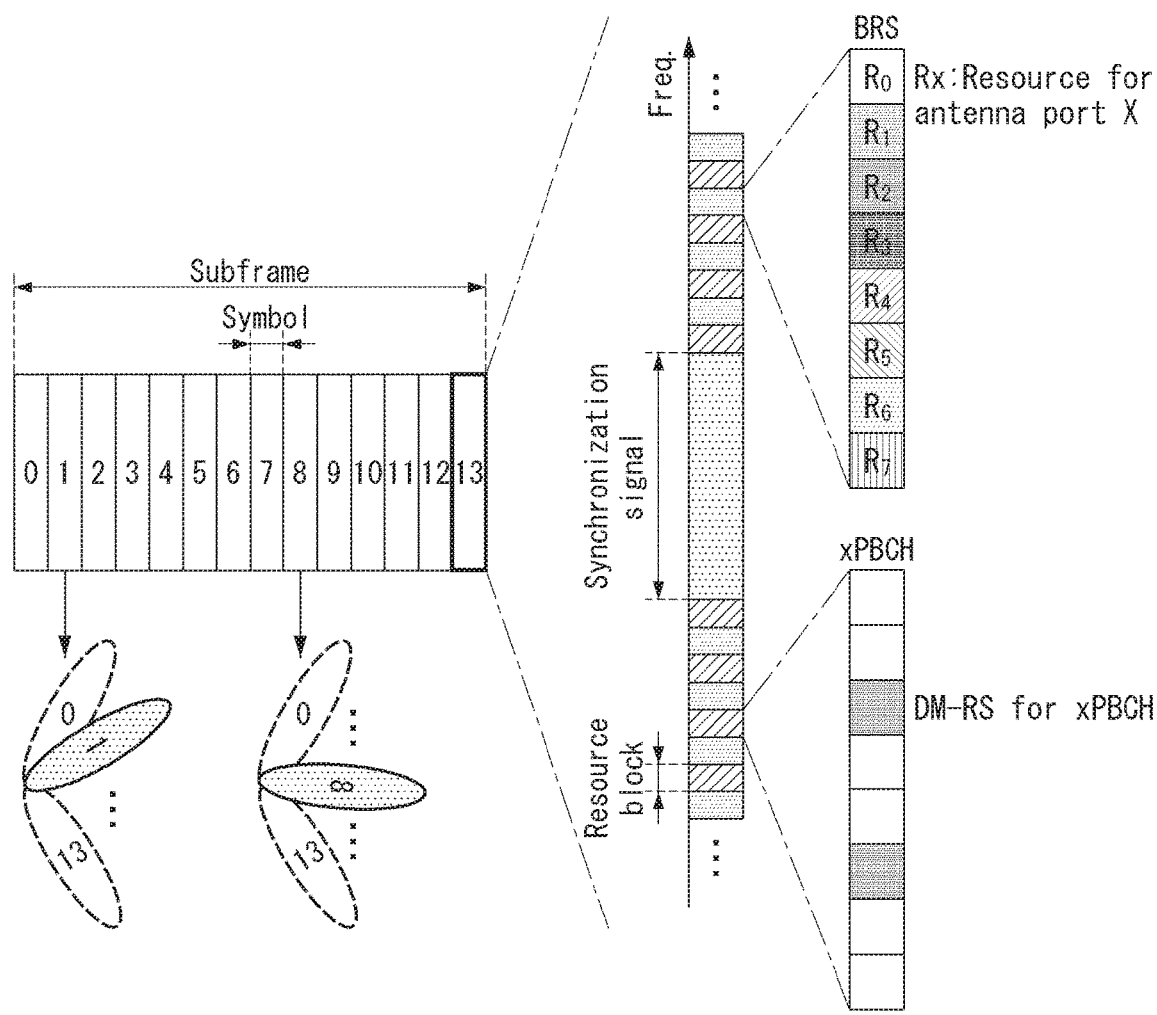
FIG. 7 is a diagram showing an example of a beam sweeping operation to which a method proposed in this specification may be applied.

FIG. 7 is a diagram showing an example of a beam sweeping operation to which a method proposed in this specification may be applied.

If a BS uses a plurality of analog beams as described above in FIG. 6, an analog beam advantageous for signal reception may be different for each UE. Accordingly, a beam sweeping operation for all of UEs to have reception opportunities by changing a plurality of analog beams to be applied by a BS based on a symbol in a specific sub-frame with respect to at least a synchronization signal, system information, and paging is taken into consideration.

FIG. 7 shows an example of a beam sweeping operation for a synchronization signal and system information in a downlink transmission process. In FIG. 7, in the new RAT, a physical resource (or a physical channel) in which system information is transmitted using a broadcasting method is called a physical broadcast channel (xPBCH).

In this case, analog beams belonging to different antenna panels within one symbol may be transmitted at the same time. A method of introducing a beam reference signal (BRS), that is, a reference signal transmitted by applying a single analog beam (corresponding to a specific antenna panel) as shown in FIG. 7 in order to measure a channel according to the analog beam, is discussed.

The BRS may be defined with respect to a plurality of antenna ports, and each antenna port of the BRS may correspond to a single analog beam.

In this case, unlike in the BRS, a synchronization signal or an xPBCH may be transmitted by applying all of analog beams within an analog beam group so that signals transmitted by specific UEs are well received.

RRM Measurement

In the LTE system, RRM operations, including Power control, Scheduling, Cell search, Cell reselection, Handover, Radio link or Connection monitoring, Connection establish/re-establish, are supported.

In this case, a serving cell may request RRM measurement information, that is, a measured value for performing an RRM operation, from a UE.

For example, a UE may measure information, such as cell search information, reference signal received power (RSRP) or reference signal received quality (RSRQ) for each cell, and may report it to a BS.

Specifically, in the LTE system, a UE receives "measConfig" from a serving cell through a higher layer signal for RRM measurement. The UE measures RSRP or RSRQ based on "measConfig."

The definition of RSRP, RSRQ and RSSI is as follows.

RSRP: RSRP may be defined as a linear average for a power contribution [W] of a resource element that delivers a cell-specific reference signal within a considered measurement frequency bandwidth. A cell-specific reference signal R0 may be used for an RSRP determination. If a UE can reliably detect that R1 is available, the UE may add R1 to R0 and determine RSRP using R1.

A reference point of RSRP may be the antenna connector of a UE.

If receiver diversity is used by a UE, a reported value should not be lower than corresponding RSRP of a specific individual diversity branch.

RSRQ: a reference signal reception quality (RSRQ) is defined as a ratio N×RSRP/(E-UTRA carrier RSSI). N is the number of RBs of an E-UTRA carrier RSSI measurement bandwidth. The measurement of the numerator and denominator needs to be performed through the same resource block set.

An E-UTRA carrier received signal strength indicator (RSSI) is received by a UE through a block from all of sources, including N resource neighboring channel interference and thermal noise, in a linear average of total received power [W] measured only in an OFDM symbol including a reference symbol for the antenna port 0 and a measurement bandwidth.

If higher layer signaling indicates a specific subframe for performing RSRQ measurement, an RSSI is measured with respect to all of OFDM symbols within the indicated subframe.

A reference point for RSRQ must be the antenna connector of a UE. If receiver diversity is used by the UE, a reported value should not be lower than corresponding RSRQ of a specific individual diversity branch.

RSSI: an RSSI means received wideband power, including thermal noise and noise occurring in a received within a bandwidth defined by a receiver pulse shaping filter.

A reference point for the measurement of an RSSI must be the antenna connector of a UE. If receiver diversity is used by the UE, a reported value should not be lower than a corresponding UTRA carrier RSSI of a specific individual reception antenna branch.

A UE operating in the LTE system according to the above definition may be allowed to measure RSRP in a bandwidth corresponding to one of 6, 15, 25, 50, 75 and 100 resource blocks (RBs) through an allowed measurement bandwidth-related information element (IE) transmitted in the system information block type 3 (SIB3) in the case of intra-frequency measurement and through an allowed measurement bandwidth transmitted in the SIB5 in the case of inter-frequency measurement.

Alternatively, if the above IE is not present, measurement may be performed in a full frequency band of a downlink (DL) system by default. In this case, when the UE receives an allowed measurement bandwidth, the UE may consider a corresponding value to be a maximum measurement bandwidth and freely measure a value of RSRP within the corresponding value.

In this case, when a serving cell transmits an IE defined as a WB-RSRQ and sets an allowed measurement bandwidth as 50 RBs or more, the UE should calculate an RSRP value of a total allowed measurement bandwidth. Meanwhile, measurement may be performed in the frequency band of the receiver of the UE according to the definition of an RSSI bandwidth with respect to the RSSI.

Figure 8:
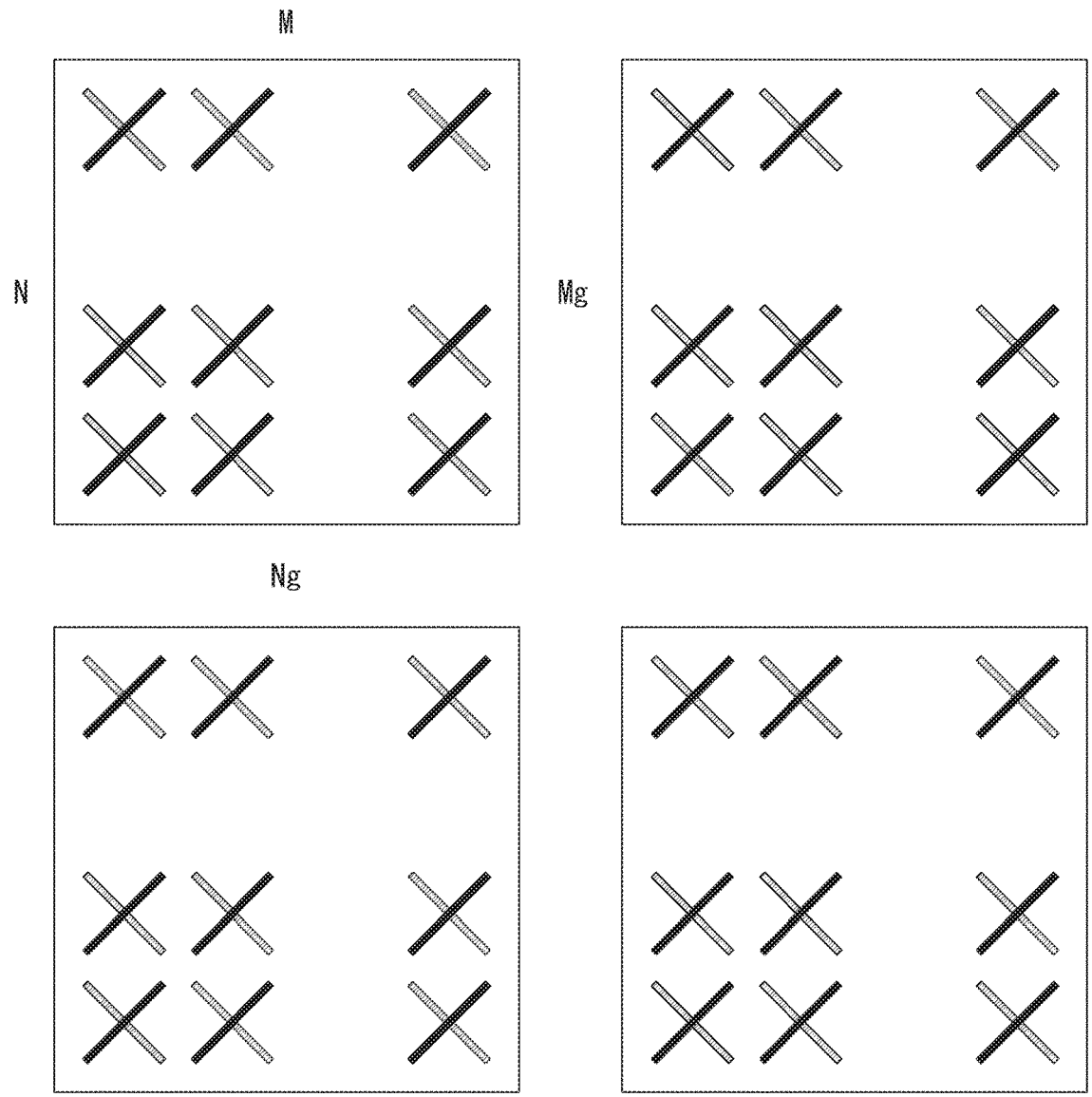
FIG. 8 is a diagram showing an example of an antenna array to which a method proposed in this specification may be applied.

FIG. 8 is a diagram showing an example of an antenna array to which a method proposed in this specification may be applied.

In FIG. 8, a generalized panel antenna array may include Mg panels and Ng panels in the horizontal domain and vertical domain, respectively.

In this case, one panel includes M columns and N rows. In FIG. 8, an X-pol antenna is assumed. Accordingly, a total number of antenna elements may include the number of 2*M*N*Mg*Ng.

Hereinafter, an LTE uplink (UL) codebook is described with reference to Table 4 to Table 8.

In Table 4 to Table 8, $v=1$ means that the number of layers is 1.

Table 4 shows an example of a codebook for transmission on antenna ports $\{20, 21\}$.

TABLE 4

| Codebook index | Number of layers | |
|---|---|---|
| | $v = 1$ | $v = 2$ |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | — |
| 2 | $\frac{1}{\sqrt{2}}\begin{bmatrix}1\\j\end{bmatrix}$ | — |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | — |
| 5 | $\frac{1}{\sqrt{2}}\begin{bmatrix}0\\1\end{bmatrix}$ | — |

Table 5 shows an example of a codebook for transmission on antenna ports $\{40, 41, 42, 43\}$ having $v=1$

TABLE 5

| Codebook index | Number of layers $v = 1$ |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

Table 6 shows an example of a codebook for transmission on antenna ports {40, 41, 42, 43} having v=2.

TABLE 6

| Codebook index | Number of layers $\upsilon = 2$ | | | |
|---|---|---|---|---|
| 0-3 | $\frac{1}{2}\begin{bmatrix} 1 & 0 \\ 1 & 0 \\ 0 & 1 \\ 0 & -j \end{bmatrix}$ | $\frac{1}{2}\begin{bmatrix} 1 & 0 \\ 1 & 0 \\ 0 & 1 \\ 0 & j \end{bmatrix}$ | $\frac{1}{2}\begin{bmatrix} 1 & 0 \\ -j & 0 \\ 0 & 1 \\ 0 & 1 \end{bmatrix}$ | $\frac{1}{2}\begin{bmatrix} 1 & 0 \\ -j & 0 \\ 0 & 1 \\ 0 & -1 \end{bmatrix}$ |
| 4-7 | $\frac{1}{2}\begin{bmatrix} 1 & 0 \\ -1 & 0 \\ 0 & 1 \\ 0 & -j \end{bmatrix}$ | $\frac{1}{2}\begin{bmatrix} 1 & 0 \\ -1 & 0 \\ 0 & 1 \\ 0 & j \end{bmatrix}$ | $\frac{1}{2}\begin{bmatrix} 1 & 0 \\ j & 0 \\ 0 & 1 \\ 0 & 1 \end{bmatrix}$ | $\frac{1}{2}\begin{bmatrix} 1 & 0 \\ j & 0 \\ 0 & 1 \\ 0 & -1 \end{bmatrix}$ |
| 8-11 | $\frac{1}{2}\begin{bmatrix} 1 & 0 \\ 0 & 1 \\ 1 & 0 \\ 0 & 1 \end{bmatrix}$ | $\frac{1}{2}\begin{bmatrix} 1 & 0 \\ 0 & 1 \\ 1 & 0 \\ 0 & -1 \end{bmatrix}$ | $\frac{1}{2}\begin{bmatrix} 1 & 0 \\ 0 & 1 \\ -1 & 0 \\ 0 & 1 \end{bmatrix}$ | $\frac{1}{2}\begin{bmatrix} 1 & 0 \\ 0 & 1 \\ -1 & 0 \\ 0 & -1 \end{bmatrix}$ |
| 12-15 | $\frac{1}{2}\begin{bmatrix} 1 & 0 \\ 0 & 1 \\ 0 & 1 \\ 1 & 0 \end{bmatrix}$ | $\frac{1}{2}\begin{bmatrix} 1 & 0 \\ 0 & 1 \\ 0 & -1 \\ 1 & 0 \end{bmatrix}$ | $\frac{1}{2}\begin{bmatrix} 1 & 0 \\ 0 & 1 \\ 0 & 1 \\ -1 & 0 \end{bmatrix}$ | $\frac{1}{2}\begin{bmatrix} 1 & 0 \\ 0 & 1 \\ 0 & -1 \\ -1 & 0 \end{bmatrix}$ |

Table 7 shows an example of a codebook for transmission on antenna ports {40, 41, 42, 43} having v=3

TABLE 7

| Codebook index | Number of layers $\upsilon = 3$ | | | |
|---|---|---|---|---|
| 0-3 | $\frac{1}{2}\begin{bmatrix} 1 & 0 & 0 \\ 1 & 0 & 0 \\ 0 & 1 & 0 \\ 0 & 0 & 1 \end{bmatrix}$ | $\frac{1}{2}\begin{bmatrix} 1 & 0 & 0 \\ -1 & 0 & 0 \\ 0 & 1 & 0 \\ 0 & 0 & 1 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ |
| 4-7 | $\frac{1}{2}\begin{bmatrix} 1 & 0 & 0 \\ 0 & 1 & 0 \\ 0 & 0 & 1 \\ 1 & 0 & 0 \end{bmatrix}$ | $\frac{1}{2}\begin{bmatrix} 1 & 0 & 0 \\ 0 & 1 & 0 \\ 0 & 0 & 1 \\ -1 & 0 & 0 \end{bmatrix}$ | $\frac{1}{2}\begin{bmatrix} 0 & 1 & 0 \\ 1 & 0 & 0 \\ 1 & 0 & 0 \\ 0 & 0 & 1 \end{bmatrix}$ | $\frac{1}{2}\begin{bmatrix} 0 & 1 & 0 \\ 1 & 0 & 0 \\ -1 & 0 & 0 \\ 0 & 0 & 1 \end{bmatrix}$ |
| 8-11 | $\frac{1}{2}\begin{bmatrix} 0 & 1 & 0 \\ 1 & 0 & 0 \\ 0 & 0 & 1 \\ 1 & 0 & 0 \end{bmatrix}$ | $\frac{1}{2}\begin{bmatrix} 0 & 1 & 0 \\ 1 & 0 & 0 \\ 0 & 0 & 1 \\ -1 & 0 & 0 \end{bmatrix}$ | $\frac{1}{2}\begin{bmatrix} 0 & 1 & 0 \\ 0 & 0 & 1 \\ 1 & 0 & 0 \\ 1 & 0 & 0 \end{bmatrix}$ | $\frac{1}{2}\begin{bmatrix} 0 & 1 & 0 \\ 0 & 0 & 1 \\ 1 & 0 & 0 \\ -1 & 0 & 0 \end{bmatrix}$ |

Table 8 shows an example of a codebook for transmission on antenna ports {40, 41, 42, 43} having v=4

TABLE 8

| Codebook index | Number of layers $\upsilon = 4$ |
|---|---|
| 0 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ |

NR codebook-related contents are described in brief, and a codebook configuration method proposed in this specification is described in detail.

If only a wideband transmit precoding matrix indicator (TPMI) or a transmitted precoding matrix indicator is used for DFT-s-OFDM, a rank 1 precoder is used in the following table (Table 9) with respect to 2Tx.

In this case, 2Tx may be construed as having the same meaning as transmission through two antenna ports.

A "codebook index" used in the following tables means a "TPMI index."

The TPMI is used to indicate a transmission precoder to be applied on a specific antenna port and may be represented as a precoding matrix or a codeword.

TABLE 9

| | Number of layers | |
|---|---|---|
| Codebook index | $\upsilon = 1$ | $\upsilon = 2$ |
| 0 | $\frac{1}{\sqrt{2}}\begin{bmatrix} 1 \\ 1 \end{bmatrix}$ | $\frac{1}{2}\begin{bmatrix} 1 & 1 \\ 1 & -1 \end{bmatrix}$ |
| 1 | $\frac{1}{\sqrt{2}}\begin{bmatrix} 1 \\ -1 \end{bmatrix}$ | $\frac{1}{2}\begin{bmatrix} 1 & 1 \\ j & -j \end{bmatrix}$ |
| 2 | $\frac{1}{\sqrt{2}}\begin{bmatrix} 1 \\ j \end{bmatrix}$ | $\frac{1}{2}\begin{bmatrix} 1 & 0 \\ 0 & 1 \end{bmatrix}$ |

TABLE 9-continued

| | Number of layers | |
|---|---|---|
| Codebook index | $\upsilon = 1$ | $\upsilon = 2$ |
| 3 | $\frac{1}{\sqrt{2}}\begin{bmatrix} 1 \\ -j \end{bmatrix}$ | — |
| 4 | $\frac{1}{\sqrt{2}}\begin{bmatrix} 1 \\ 0 \end{bmatrix}$ | — |

TABLE 9-continued

| Codebook index | Number of layers | |
|---|---|---|
| | $v = 1$ | $v = 2$ |
| 5 | $\frac{1}{\sqrt{2}}\begin{bmatrix} 0 \\ 1 \end{bmatrix}$ | — |

In Rel-15, single stage downlink control information (DCI) having a size semi-statically set to deliver a TPMI, an SRS resource indicator (SRI) or a transmit (or transmitted) rank indicator (TRI) is used with respect to 2Tx.

A total DCI size in which a TPMI, TRI and SRI are combined is not different depending on PUSCH resource allocation for single stage DCI.

A UE capability to identify whether an UL MIMO-capable UE can support coherent transmission through its own transmit chain is specified.

Hereinafter, if discrete Fourier transform spread orthogonal frequency division multiplexing (DFT-s-OFDM) is used in an environment, such as NR proposed in this specification, a method of designing a codebook are described through various embodiments.

An antenna used in this specification indicates an antenna port or an antenna element, and is represented as an "antenna port", for convenience of description.

First Embodiment

The first embodiment relates to a method of configuring a 4Tx codebook of DFT-s-OFDM according to Table 10 to Table 19 or a combination thereof.

In the case of an LTE Uplink codebook, the TPMIs of all of ranks are configured to be joint-encoded, thus reducing overhead of DCI. Rank 1 includes 24 states.

In the case of NR, a performance gain can be achieved by increasing codebook granularity using all of 32 states because DFT-s-OFDM supports only rank 1.

Furthermore, the remaining 8 states may include a combination of 1-port selection, 2-port selection and/or 3-port selection codebooks, and Table 10 to Table 19 show examples thereof.

Table 10 shows an example of a 4Tx DFT-s-OFDM codebook for rank 1.

TABLE 10

| Codebook index | Number of layers $v = 1$ |
|---|---|
| 0-7 | $\frac{1}{2}\begin{bmatrix} 1 \\ 1 \\ 1 \\ -1 \end{bmatrix}$ $\frac{1}{2}\begin{bmatrix} 1 \\ 1 \\ j \\ j \end{bmatrix}$ $\frac{1}{2}\begin{bmatrix} 1 \\ 1 \\ -1 \\ 1 \end{bmatrix}$ $\frac{1}{2}\begin{bmatrix} 1 \\ 1 \\ -j \\ -j \end{bmatrix}$ $\frac{1}{2}\begin{bmatrix} 1 \\ j \\ 1 \\ j \end{bmatrix}$ $\frac{1}{2}\begin{bmatrix} 1 \\ j \\ j \\ 1 \end{bmatrix}$ $\frac{1}{2}\begin{bmatrix} 1 \\ j \\ -1 \\ -j \end{bmatrix}$ $\frac{1}{2}\begin{bmatrix} 1 \\ j \\ -j \\ -1 \end{bmatrix}$ |
| 8-15 | $\frac{1}{2}\begin{bmatrix} 1 \\ -1 \\ 1 \\ 1 \end{bmatrix}$ $\frac{1}{2}\begin{bmatrix} 1 \\ -1 \\ j \\ -j \end{bmatrix}$ $\frac{1}{2}\begin{bmatrix} 1 \\ -1 \\ -1 \\ -1 \end{bmatrix}$ $\frac{1}{2}\begin{bmatrix} 1 \\ -1 \\ -j \\ j \end{bmatrix}$ $\frac{1}{2}\begin{bmatrix} 1 \\ -j \\ 1 \\ -j \end{bmatrix}$ $\frac{1}{2}\begin{bmatrix} 1 \\ -j \\ j \\ -1 \end{bmatrix}$ $\frac{1}{2}\begin{bmatrix} 1 \\ -j \\ -1 \\ j \end{bmatrix}$ $\frac{1}{2}\begin{bmatrix} 1 \\ -j \\ -j \\ 1 \end{bmatrix}$ |
| 16-23 | $\frac{1}{2}\begin{bmatrix} 1 \\ 0 \\ 1 \\ 0 \end{bmatrix}$ $\frac{1}{2}\begin{bmatrix} 1 \\ 0 \\ -1 \\ 0 \end{bmatrix}$ $\frac{1}{2}\begin{bmatrix} 1 \\ 0 \\ j \\ 0 \end{bmatrix}$ $\frac{1}{2}\begin{bmatrix} 1 \\ 0 \\ -j \\ 0 \end{bmatrix}$ $\frac{1}{2}\begin{bmatrix} 0 \\ 1 \\ 0 \\ 1 \end{bmatrix}$ $\frac{1}{2}\begin{bmatrix} 0 \\ 1 \\ 0 \\ -1 \end{bmatrix}$ $\frac{1}{2}\begin{bmatrix} 0 \\ 1 \\ 0 \\ j \end{bmatrix}$ $\frac{1}{2}\begin{bmatrix} 0 \\ 1 \\ 0 \\ -j \end{bmatrix}$ |
| 24-31 | $\frac{1}{2}\begin{bmatrix} 1 \\ 1 \\ 0 \\ 0 \end{bmatrix}$ $\frac{1}{2}\begin{bmatrix} 1 \\ -1 \\ 0 \\ 0 \end{bmatrix}$ $\frac{1}{2}\begin{bmatrix} 1 \\ j \\ 0 \\ 0 \end{bmatrix}$ $\frac{1}{2}\begin{bmatrix} 1 \\ -j \\ 0 \\ 0 \end{bmatrix}$ $\frac{1}{2}\begin{bmatrix} 0 \\ 0 \\ 1 \\ 1 \end{bmatrix}$ $\frac{1}{2}\begin{bmatrix} 0 \\ 0 \\ 1 \\ -1 \end{bmatrix}$ $\frac{1}{2}\begin{bmatrix} 0 \\ 0 \\ 1 \\ j \end{bmatrix}$ $\frac{1}{2}\begin{bmatrix} 0 \\ 0 \\ 1 \\ -j \end{bmatrix}$ |

Thereafter, in the case of Table 11 to Table 19, For convenience of expression, 0-23 indices are considered to use the 0-23 indices of Table 10 without any change, a codebook (or a codeword or precoding matrix) corresponding to the 24-31 indices complies with the proposal of each table below.

Table 11 shows another example of a 4Tx DFT-s-OFDM codebook for rank 1.

TABLE 11

| Codebook index | Number of layers $\upsilon = 1$ |
|---|---|
| 24-31 | $\frac{1}{2}\begin{bmatrix}1\\0\\0\\1\end{bmatrix}$ $\frac{1}{2}\begin{bmatrix}1\\0\\0\\-1\end{bmatrix}$ $\frac{1}{2}\begin{bmatrix}1\\0\\0\\j\end{bmatrix}$ $\frac{1}{2}\begin{bmatrix}1\\0\\0\\-j\end{bmatrix}$ $\frac{1}{2}\begin{bmatrix}0\\1\\1\\0\end{bmatrix}$ $\frac{1}{2}\begin{bmatrix}0\\1\\-1\\0\end{bmatrix}$ $\frac{1}{2}\begin{bmatrix}0\\1\\j\\0\end{bmatrix}$ $\frac{1}{2}\begin{bmatrix}0\\1\\-j\\0\end{bmatrix}$ |

Table 12 and Table 13 show examples including combinations of Table 10 and Table 11.

Table 12 is an example in which the degree of freedom of an antenna selection combination is abandoned (when two antennas of Tx antenna Nos. 0, 1, 2, and 3 are "On", a combination of the Tx antenna Nos. 2 and 3 and a combination of the Tx antenna Nos. 1 and 2 are abandoned) and the codebook granularity of a given antenna port combination has been extended.

That is, in Table 12, a QPSK co-phase of 1, −1, j, −j is considered.

Unlike Table 12, Table 13 is an example in which a specific number (e.g., two, {1, −1} or {1, j}) is used as the co-phase of a given antenna port combination and a combination of antenna ports that become "On" has been increased.

Table 12 shows another example of a 4Tx DFT-s-OFDM codebook for rank 1.

TABLE 12

| Codebook index | Number of layers $\upsilon = 1$ |
|---|---|
| 24-31 | $\frac{1}{2}\begin{bmatrix}1\\1\\0\\0\end{bmatrix}$ $\frac{1}{2}\begin{bmatrix}1\\-1\\0\\0\end{bmatrix}$ $\frac{1}{2}\begin{bmatrix}1\\j\\0\\0\end{bmatrix}$ $\frac{1}{2}\begin{bmatrix}1\\-j\\0\\0\end{bmatrix}$ $\frac{1}{2}\begin{bmatrix}1\\0\\0\\1\end{bmatrix}$ $\frac{1}{2}\begin{bmatrix}1\\0\\0\\-1\end{bmatrix}$ $\frac{1}{2}\begin{bmatrix}1\\0\\0\\j\end{bmatrix}$ $\frac{1}{2}\begin{bmatrix}1\\0\\0\\-j\end{bmatrix}$ |

Table 13 shows another example of a 4Tx DFT-s-OFDM codebook for rank 1.

TABLE 13

| Codebook index | Number of layers $\upsilon = 1$ |
|---|---|
| 24-31 | $\frac{1}{2}\begin{bmatrix}1\\1\\0\\0\end{bmatrix}$ $\frac{1}{2}\begin{bmatrix}1\\-1\\0\\0\end{bmatrix}$ $\frac{1}{2}\begin{bmatrix}0\\0\\1\\1\end{bmatrix}$ $\frac{1}{2}\begin{bmatrix}0\\0\\1\\-1\end{bmatrix}$ $\frac{1}{2}\begin{bmatrix}1\\0\\0\\1\end{bmatrix}$ $\frac{1}{2}\begin{bmatrix}1\\0\\0\\-1\end{bmatrix}$ $\frac{1}{2}\begin{bmatrix}0\\1\\1\\0\end{bmatrix}$ $\frac{1}{2}\begin{bmatrix}0\\1\\-1\\0\end{bmatrix}$ |

In the antenna port "On" and/or "Off" codebook of Table 10 to Table 13, a case where two antenna ports are selected in 4Tx has been considered. However, Table 14 shows an example in which 1 and 3 antenna ports are selected from 4Tx.

As described above, an advantage of an antenna selection codebook is that if performance deterioration occurs due to transmission delay between antenna ports upon wideband TPMI transmission (by a base station), the base station (e.g., gNB) can indicate that which antenna ports can be transmitted at the same time (UL coherent transmission between antenna ports) through a codebook.

Table 14 shows another example of a 4Tx DFT-s-OFDM codebook for rank 1.

TABLE 14

| Codebook index | Number of layers $v = 1$ | | | | | | | |
|---|---|---|---|---|---|---|---|---|
| 24-31 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\1\\1\\0\end{bmatrix}$ | $\frac{1}{2}\begin{bmatrix}1\\1\\0\\1\end{bmatrix}$ | $\frac{1}{2}\begin{bmatrix}1\\0\\1\\1\end{bmatrix}$ | $\frac{1}{2}\begin{bmatrix}0\\1\\1\\1\end{bmatrix}$ |

Table 15 shows another example of a 4Tx DFT-s-OFDM codebook for rank 1.

TABLE 15

| Codebook index | Number of layers $v = 1$ | | | | | | | |
|---|---|---|---|---|---|---|---|---|
| 24-31 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | $\frac{1}{2}\begin{bmatrix}1\\1\\1\\0\end{bmatrix}$ | $\frac{1}{2}\begin{bmatrix}1\\1\\-1\\0\end{bmatrix}$ | $\frac{1}{2}\begin{bmatrix}1\\1\\j\\0\end{bmatrix}$ | $\frac{1}{2}\begin{bmatrix}1\\1\\-j\\0\end{bmatrix}$ |

Table 14 and Table 15 have a great effect in the battery saving of a UE in the case of 1-port selection, but performance deterioration may be expected because an antenna array gain is rarely obtained.

Accordingly, a method of further allocating the state for 1-port selection to the state for 3-port selection may be taken into consideration, and Table 16 and Table 17 show examples thereof.

That is, as in Table 16 and Table 17, to provide the degree of freedom to port selection has an advantage in that it can increase flexibility in the Tx antenna design of a UE.

Table 16 shows another example of a 4Tx DFT-s-OFDM codebook for rank 1.

TABLE 16

| Codebook index | Number of layers $v = 1$ | | | | | | | |
|---|---|---|---|---|---|---|---|---|
| 24-31 | $\frac{1}{2}\begin{bmatrix}1\\1\\1\\0\end{bmatrix}$ | $\frac{1}{2}\begin{bmatrix}1\\1\\0\\1\end{bmatrix}$ | $\frac{1}{2}\begin{bmatrix}1\\0\\1\\1\end{bmatrix}$ | $\frac{1}{2}\begin{bmatrix}0\\1\\1\\1\end{bmatrix}$ | $\frac{1}{2}\begin{bmatrix}1\\1\\-1\\0\end{bmatrix}$ | $\frac{1}{2}\begin{bmatrix}1\\1\\0\\-1\end{bmatrix}$ | $\frac{1}{2}\begin{bmatrix}1\\0\\1\\-1\end{bmatrix}$ | $\frac{1}{2}\begin{bmatrix}0\\1\\1\\-1\end{bmatrix}$ |

Performance of a codebook may be determined according to a method of selecting a codeword that maximizes the Euclidean Distance between codewords configuring a codebook.

In this case, the Euclidean Distance may be defined like Equation 2.

$$\text{Dist}(a,b) = \|a-b\| \quad \text{[Equation 2]}$$

In this case, "a" and "b" are vectors having the same length.

If the metric (Equation 2) is used, a codeword to maximize the Euclidean distance may be codebook indices 24-27 of Table 17.

In this case, Table 18 and Table 19 may be taken into consideration because only a specific first antenna port is not used.

Table 17 shows another example of a 4Tx DFT-s-OFDM codebook for rank 1.

TABLE 17

| Codebook index | Number of layers $v = 1$ | | | | | | | |
|---|---|---|---|---|---|---|---|---|
| 24-31 | $\frac{1}{2}\begin{bmatrix}0\\1\\1\\1\end{bmatrix}$ | $\frac{1}{2}\begin{bmatrix}0\\1\\-1\\-1\end{bmatrix}$ | $\frac{1}{2}\begin{bmatrix}0\\1\\j\\-j\end{bmatrix}$ | $\frac{1}{2}\begin{bmatrix}0\\1\\-j\\j\end{bmatrix}$ | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ |

Table 18 shows another example of a 4Tx DFT-s-OFDM codebook for rank 1.

TABLE 18

| Codebook index | Number of layers $\upsilon = 1$ |
|---|---|
| 24-31 | $\frac{1}{2}\begin{bmatrix}0\\1\\1\\1\end{bmatrix}$ $\frac{1}{2}\begin{bmatrix}0\\1\\-1\\-1\end{bmatrix}$ $\frac{1}{2}\begin{bmatrix}0\\1\\j\\-j\end{bmatrix}$ $\frac{1}{2}\begin{bmatrix}0\\1\\-j\\j\end{bmatrix}$ $\frac{1}{2}\begin{bmatrix}1\\-1\\0\\1\end{bmatrix}$ $\frac{1}{2}\begin{bmatrix}1\\-1\\0\\-1\end{bmatrix}$ $\frac{1}{2}\begin{bmatrix}1\\-1\\0\\j\end{bmatrix}$ $\frac{1}{2}\begin{bmatrix}1\\-1\\0\\-j\end{bmatrix}$ |

Table 19 shows another example of a 4Tx DFT-s-OFDM codebook for rank 1.

TABLE 19

| Codebook index | Number of layers $\upsilon = 1$ |
|---|---|
| 24-31 | $\frac{1}{2}\begin{bmatrix}1\\-1\\1\\0\end{bmatrix}$ $\frac{1}{2}\begin{bmatrix}1\\-1\\-1\\0\end{bmatrix}$ $\frac{1}{2}\begin{bmatrix}1\\-1\\j\\0\end{bmatrix}$ $\frac{1}{2}\begin{bmatrix}1\\-1\\-j\\0\end{bmatrix}$ $\frac{1}{2}\begin{bmatrix}1\\-1\\0\\1\end{bmatrix}$ $\frac{1}{2}\begin{bmatrix}1\\-1\\0\\-1\end{bmatrix}$ $\frac{1}{2}\begin{bmatrix}1\\-1\\0\\j\end{bmatrix}$ $\frac{1}{2}\begin{bmatrix}1\\-1\\0\\-j\end{bmatrix}$ |

Second Embodiment

The second embodiment relates to a method of configuring an x-bit (e.g., x=6) table having a greater bit-width in order to include the codebook of the first embodiment in the case of a 4Tx codebook of DFT-s-OFDM.

An LTE uplink 4Tx codebook requires 6 bits because a transmit precoding indicator (TPI) and a transmit rank indicator (TRI) are jointly indicated.

The first embodiment has proposed a configuration method using 5 bits in order to reduce signaling overhead of 6 bits.

The second embodiment proposes a method of configuring granularity for rank 1 more abundantly, having the same bit-width as the LTE system.

In Table 20, 16-31 indices have been added in order to make more abundant granularity when all of 4Txs are used.

That is, the co-phases of the fixed 0, 1 and 2 Txs have used QPSK and a co-phase having only one granularity corresponding to the No. 3 Tx has been used. However, the 16-31 indices of Table 20 are a case where granularity of a co-phase corresponding to the No. 3 Tx has been increased to "2."

Thereafter, the 32-63 indices of Table 20 correspond to a codeword for antenna port selection.

Table 20 shows another example of a 4Tx DFT-s-OFDM codebook for rank 1.

TABLE 20

| Codebook index | Number of layers $\upsilon = 1$ |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\-j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\1\\1\\-j\end{bmatrix}$ $\frac{1}{2}\begin{bmatrix}1\\1\\j\\-1\end{bmatrix}$ $\frac{1}{2}\begin{bmatrix}1\\1\\-1\\j\end{bmatrix}$ $\frac{1}{2}\begin{bmatrix}1\\1\\-j\\1\end{bmatrix}$ $\frac{1}{2}\begin{bmatrix}1\\j\\1\\-1\end{bmatrix}$ $\frac{1}{2}\begin{bmatrix}1\\j\\j\\j\end{bmatrix}$ $\frac{1}{2}\begin{bmatrix}1\\j\\-1\\1\end{bmatrix}$ $\frac{1}{2}\begin{bmatrix}1\\j\\-j\\-j\end{bmatrix}$ |
| 24-31 | $\frac{1}{2}\begin{bmatrix}1\\-1\\1\\j\end{bmatrix}$ $\frac{1}{2}\begin{bmatrix}1\\-1\\j\\1\end{bmatrix}$ $\frac{1}{2}\begin{bmatrix}1\\-1\\-1\\-j\end{bmatrix}$ $\frac{1}{2}\begin{bmatrix}1\\-1\\-j\\-1\end{bmatrix}$ $\frac{1}{2}\begin{bmatrix}1\\-j\\1\\1\end{bmatrix}$ $\frac{1}{2}\begin{bmatrix}1\\-j\\j\\-j\end{bmatrix}$ $\frac{1}{2}\begin{bmatrix}1\\-j\\-1\\-1\end{bmatrix}$ $\frac{1}{2}\begin{bmatrix}1\\-j\\-j\\j\end{bmatrix}$ |

TABLE 20-continued

| Codebook index | Number of layers $\upsilon = 1$ |
| --- | --- |
| 32-39 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |
| 40-47 | $\frac{1}{2}\begin{bmatrix}1\\1\\0\\0\end{bmatrix}$ $\frac{1}{2}\begin{bmatrix}1\\-1\\0\\0\end{bmatrix}$ $\frac{1}{2}\begin{bmatrix}1\\j\\0\\0\end{bmatrix}$ $\frac{1}{2}\begin{bmatrix}1\\-j\\0\\0\end{bmatrix}$ $\frac{1}{2}\begin{bmatrix}0\\0\\1\\1\end{bmatrix}$ $\frac{1}{2}\begin{bmatrix}0\\0\\1\\-1\end{bmatrix}$ $\frac{1}{2}\begin{bmatrix}0\\0\\1\\j\end{bmatrix}$ $\frac{1}{2}\begin{bmatrix}0\\0\\1\\-j\end{bmatrix}$ |
| 48-55 | $\frac{1}{2}\begin{bmatrix}1\\0\\0\\1\end{bmatrix}$ $\frac{1}{2}\begin{bmatrix}1\\0\\0\\-1\end{bmatrix}$ $\frac{1}{2}\begin{bmatrix}1\\0\\0\\j\end{bmatrix}$ $\frac{1}{2}\begin{bmatrix}1\\0\\0\\-j\end{bmatrix}$ $\frac{1}{2}\begin{bmatrix}0\\1\\1\\0\end{bmatrix}$ $\frac{1}{2}\begin{bmatrix}0\\1\\-1\\0\end{bmatrix}$ $\frac{1}{2}\begin{bmatrix}0\\1\\j\\0\end{bmatrix}$ $\frac{1}{2}\begin{bmatrix}0\\1\\-j\\0\end{bmatrix}$ |
| 56-63 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\1\\1\\0\end{bmatrix}$ $\frac{1}{2}\begin{bmatrix}1\\1\\0\\1\end{bmatrix}$ $\frac{1}{2}\begin{bmatrix}1\\0\\1\\1\end{bmatrix}$ $\frac{1}{2}\begin{bmatrix}0\\1\\1\\1\end{bmatrix}$ |

In the codebook, in the case of 3-port (indices 60-63), the codewords of Table 16 to Table 19 may be used.

Third Embodiment

In the third embodiment, a codebook may be indicated by a TPMI 1 used to indicate antenna port selection (4CL, L=1, 2, 3, 4) and a port combining codebook TPMI 2 of a Tx antenna port selected by the TPMI 1.

The third embodiment may be applied to select an (antenna) panel and to select or determine a codebook for an antenna port in the selected panel.

In the third embodiment, the TPMI 1 and TPMI 2 may be indicated by different fields within DCI, and the size of the TPMI 2 may have dependency on the TPMI 1.

The third embodiment has an advantage in that more efficient signaling is possible because a bit-width for total TPMI indication varies, but the complexity of a UE for decoding a DCI size may rise because the DCI size varies.

The configuration of the TPMI 1 is represented as an X-bitmap (e.g., X=4) in the case of an X-port, for example, and may indicate an antenna port(s) to which a port combining codebook is applied with respect to a UE.

For example, if a 4-bitmap "1010" is indicated, Nos. 0 and ports may be considered to be "ON."

Furthermore, a UE does not expect that the bitmap of "0000" (i.e., all of antenna ports are OFF) is indicated.

Alternatively, the bitmap may be indicated as follows using a table (or a subset thereof, for example, if only the 1, 2, 4 antenna selection is allowed).

Table 21 shows an example of a 4Tx TPMI 1 configuration.

TABLE 21

| Codebook index | Number of layers $\upsilon = 1$ |
| --- | --- |
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\1\\0\\0\end{bmatrix}$ $\frac{1}{2}\begin{bmatrix}1\\0\\1\\0\end{bmatrix}$ $\frac{1}{2}\begin{bmatrix}1\\0\\0\\1\end{bmatrix}$ $\frac{1}{2}\begin{bmatrix}0\\1\\1\\0\end{bmatrix}$ |
| 8-15 | $\frac{1}{2}\begin{bmatrix}0\\1\\0\\1\end{bmatrix}$ $\frac{1}{2}\begin{bmatrix}0\\0\\1\\1\end{bmatrix}$ $\frac{1}{2}\begin{bmatrix}1\\1\\1\\0\end{bmatrix}$ $\frac{1}{2}\begin{bmatrix}1\\1\\0\\1\end{bmatrix}$ $\frac{1}{2}\begin{bmatrix}1\\0\\1\\1\end{bmatrix}$ $\frac{1}{2}\begin{bmatrix}0\\1\\1\\1\end{bmatrix}$ $\frac{1}{2}\begin{bmatrix}1\\1\\1\\1\end{bmatrix}$ — |

Furthermore, in the case of 4Tx, an example of a TPMI 2 configuration is as follows.

Y is the bit width of granularity of a co-phase, and indicates QPSK (1, −1, j, −j) in the case of Y=2 and may be configured through higher layer signaling.

1-port selection, 0-bit TPMI2
2-port selection, Y-bit TPMI2

$$TPMI2 = \begin{bmatrix} 1 \\ \exp\left(\frac{j2\pi n}{2^Y}\right) \end{bmatrix}, n = 0, 1, \ldots, 2^Y - 1 \quad \text{[Equation 3]}$$

For example, Y=2 and an index 8 is indicated in the TPMI1. In the case of n=1 of the TPMI2, a UE may recognize that the final TPMI has $$\frac{1}{2}\begin{bmatrix} 0 \\ 1 \\ 0 \\ j \end{bmatrix}.$$

3-port selection, 2Y-bit TPMI2

$$TMPI2 = \begin{bmatrix} 1 \\ \exp\left(\frac{j2\pi n_1}{2^Y}\right) \\ \exp\left(\frac{j2\pi n_2}{2^Y}\right) \end{bmatrix}, n_i = 0, 1, \ldots, 2^Y - 1, \quad \text{[Equation 4]}$$

$$i = 1, 2$$

For example, Y=2 and an index 10 is indicated in the TPMI1. In the case of n1=1 of the TPMI2 and n2=3, a UE may recognize that the final TPMI includes $$\frac{1}{2}\begin{bmatrix} 0 \\ j \\ -j \\ 0 \end{bmatrix}.$$

4-port selection, 3 Y-bit TPMI2

$$TMPI2 = \begin{bmatrix} 1 \\ \exp\left(\frac{j2\pi n_1}{2^Y}\right) \\ \exp\left(\frac{j2\pi n_2}{2^Y}\right) \\ \exp\left(\frac{j2\pi n_3}{2^Y}\right) \end{bmatrix}, n_i = 0, 1, \ldots, 2^Y - 1, \quad \text{[Equation 5]}$$

$$i = 1, 2, 3$$

In the above example, if TPMI1+TPMI2 are independently signaled, there is signaling overhead of 10 bits as a maximum TPMI1=4 bits and TPMI2=6 bits (assuming Y=2).

In order to reduce overhead of the TPMI2 of the third embodiment or to obviate bit-width dependency on the TPMI1, the TPMI2 may be previously agreed as a codebook having a subset of the aforementioned methods.

For example, the TPMI2 may be fixed to 4 bits regardless of the TPMI1.

In this case, in the case of the 1-port and 2-port having remaining states, a UE recognizes them as reserved states and does not expect indication for the states.

Furthermore, in the case of 4-port selection having an insufficient state, the 4-port selection may be sub-sampled as 4-bit according to the specific agreement, and an example thereof may be a codebook corresponding to the Nos. 0 to 15 indices of Table 20.

The aforementioned methods have been described in connection with DFT-s-OFDM, but may also be applied to CP-OFDM.

In this case, the TPMI2 may be joint-encoded into TPMI2+TRI and signaled.

Fourth Embodiment

In the fourth embodiment, in the case of antenna selection codeword belonging to the above proposed codebooks and having an entry of "0", specific values (UE-reported values and/or pre-defined values) of a scaling factor may be set through higher layer signaling depending on the UE capability.

The higher layer signaling may be RRC, a medium access control (MAC) control element (CE) or DCI, for example.

For example, in the case of rank 1, in the case of an expression as 4Tx codebook, $$\frac{1}{\rho}v,$$

the value of $\rho$ may be indicated as $\rho \in \{2\sqrt{6}, 2\sqrt{2}, 4\}$.

In this case, $\rho$ is a scaling factor, and v indicates a length-L (L=4) vector.

As the value of $\rho$ increases, the dynamic range of the power amplifier of a UE is increased, and there is a good possibility that the UE is a high-end UE.

The UE may report a possible value of the $\rho$ values to a base station by taking into consideration the dynamic range of the power amplifier of its own RF-chain.

In this case, the base station may set a specific value of the $\rho$ values through a higher layer with respect to the UE or may previously define a specific value (e.g., max value) of values reported by the UE.

In general, the value of $\rho$ is semi-statically set depending on the capability of a UE.

However, in the case of UL heavy traffic, if the value of $\rho$ is higher, interference may be caused. Accordingly, the value of $\rho$ may be dynamically indicated using DCI in order to control the value of $\rho$.

Alternatively, a UE may report a change request or change indicator for a $\rho$ value to a base station by considering its own battery.

Likewise, the fourth embodiment may be identically applied to CP-OFDM, and all of the embodiments may be identically applied to CP-OFDM.

Figure 9:
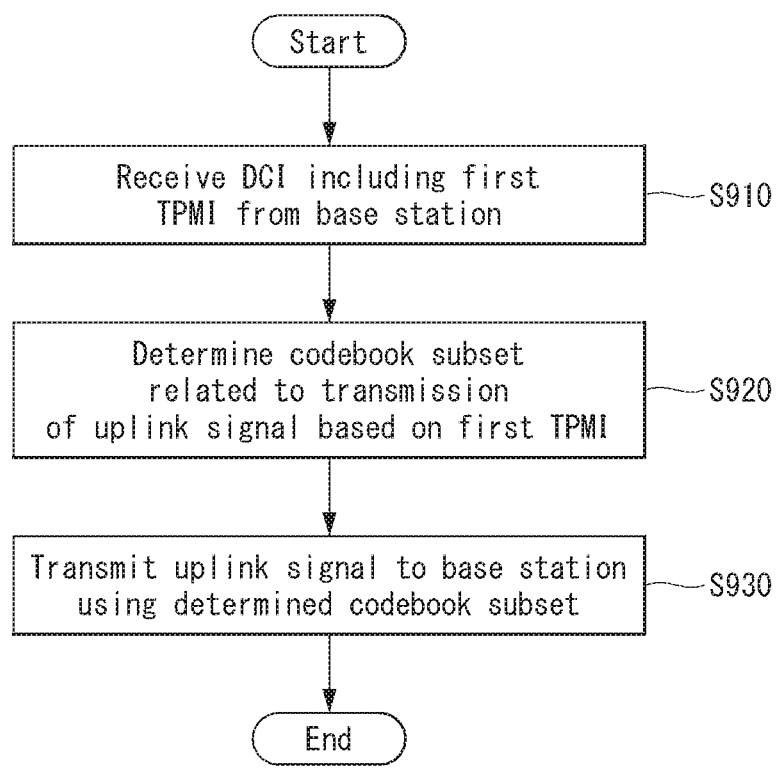
FIG. 9 is a flowchart showing an example of an operating method of a UE performing codebook-based uplink transmission, which is proposed in this specification.

FIG. 9 is a flowchart showing an example of an operating method of a UE performing codebook-based uplink transmission, which is proposed in this specification.

First, the UE receives downlink control information (DCI), including a first transmit precoding matrix indicator (TPMI), from a base station (S910).

In this case, the first TPMI may be a wideband TPMI.

Furthermore, the UE determines a codebook subset related to the transmission of an uplink signal based on the first TPMI (S920).

In this case, the codebook subset is included in a codebook for rank 1 using four antenna ports.

Furthermore, the codebook subset may include at least one codeword for selecting one antenna port. For detailed contents, reference is made to Table 14 and Table 15.

Specifically, the at least one codeword may be configured as $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix} \text{ and } \frac{1}{2}\begin{bmatrix}0\\0\\0\\1\end{bmatrix}.$$

That is, the at least one codeword may be configured as codewords (or precoding matrices or precoders or codebook subsets) corresponding to a 4 codebook index.

That is, the 1-port selection proposed in this specification may be configured as using the 4 states of a codebook.

Furthermore, the codebook for rank 1 using the one antenna ports may be codebook using discrete Fourier transform spread orthogonal frequency division multiplexing (DFT-s-OFDM).

As shown in Table 14 and Table 15, the 1-port selection has an advantage in the battery saving of a UE because only one antenna port is "ON."

Furthermore, the UE transmits an uplink signal to the base station using the determined codebook subset (S930).

Additionally, the DCI may further include a second TPMI related to the port combining of an antenna port selected based on the first TPMI.

The size of the second TPMI may be determined based on the size of the first TPMI.

In this case, the first TPMI may be expressed as an X-bitmap.

The X value indicates the number of antenna ports. For example, if the number of antenna ports is 4, the X value is 4.

Furthermore, the second TPMI may be configured based on Equations 3 to 5.

Additionally, the UE may perform scaling on a codeword whose normalize is not "1" depending on its capability.

That is, the UE receives signaling, including a scaling element to be applied to the at least one codeword, from the base station, and may perform scaling on the aforementioned codeword by applying the power scaling factor to the at least one codeword.

Furthermore, the power scaling factor may be configured by taking into consideration the capability of the UE.

General Apparatus to which the Present Invention May be Applied

Figure 10:
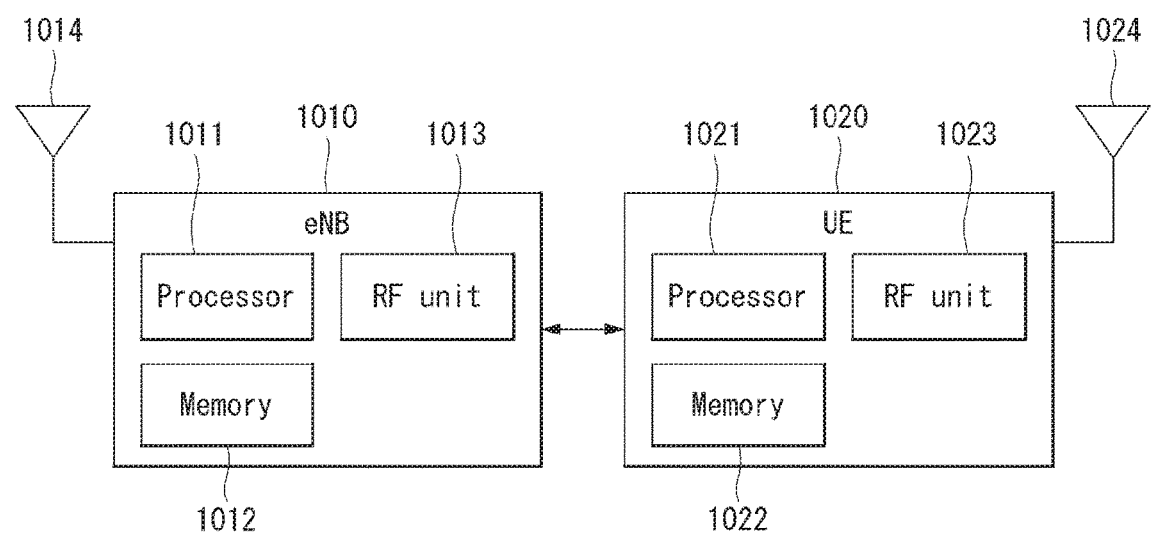
FIG. 10 illustrates a block diagram of a wireless communication apparatus to which the methods proposed in this specification may be applied.

FIG. 10 illustrates a block diagram of a wireless communication apparatus to which the methods proposed in this specification may be applied.

Referring to FIG. 10, the wireless communication system includes an eNB 1010 and multiple UEs 1020 disposed in the eNB area.

The eNB and the UE may be represented as respective wireless devices.

The eNB includes a processor 1011, memory 1012 and a radio frequency (RF) module 1013. The processor 1011 implements the functions, processes and/or methods proposed in FIGS. 1 to 9. The layers of a radio interface protocol may be implemented by the processor. The memory is connected to the processor and stores a variety of types of information for driving the processor. The RF module is connected to the processor and transmits and/or receives radio signals.

The UE includes a processor 1021, memory 1022 and an RF module 1023.

The processor implements the functions, processes and/or methods proposed in FIGS. 1 to 9. The layers of a radio interface protocol may be implemented by the processor. The memory is connected to the processor and stores a variety of types of information for driving the processor. The RF module is connected to the processor and transmits and/or receives radio signals.

The memory 1012, 1022 may be positioned inside or outside the processor 1011, 1021 and may be connected to the processor by various well-known means.

Furthermore, the eNB and/or the UE may have a single antenna or multiple antennas.

The antenna 1014, 1024 functions to transmit and receive radio signals.

Figure 11:
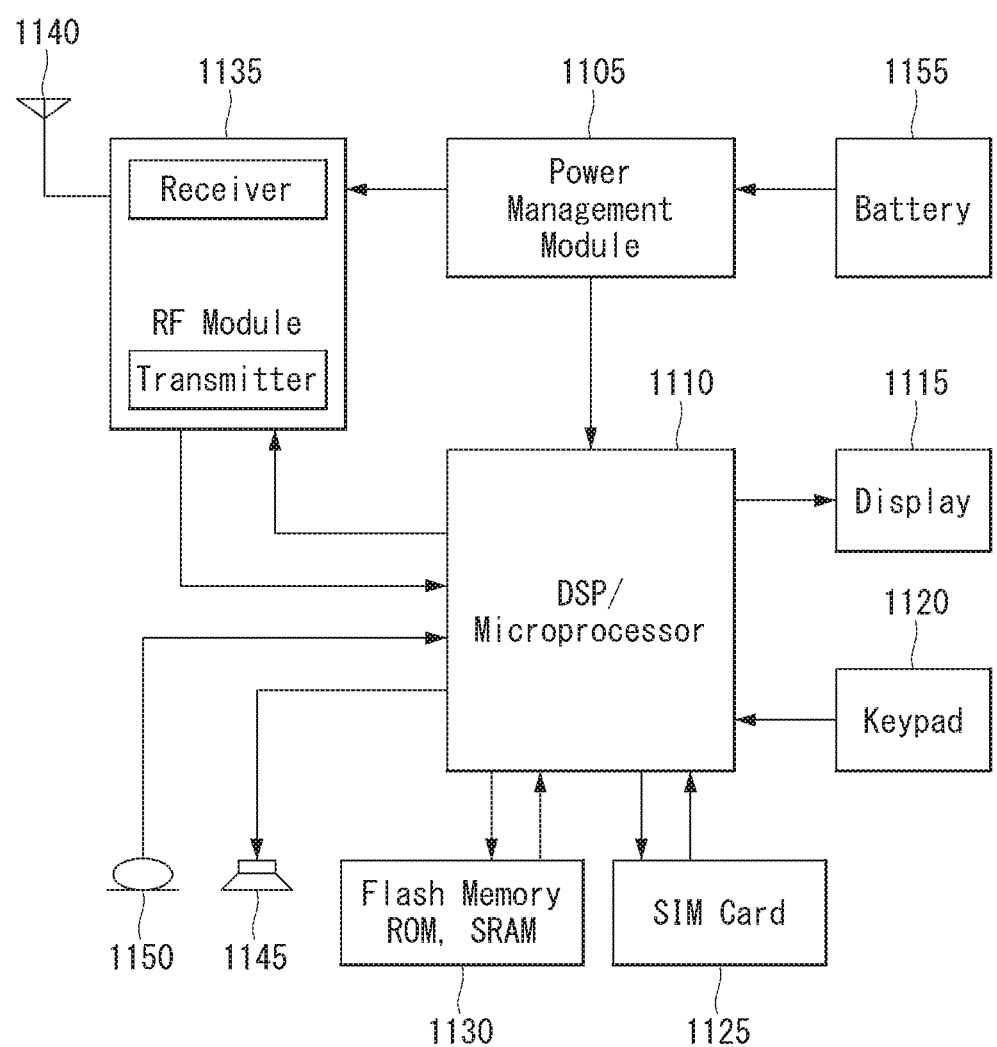
FIG. 11 illustrates a block diagram of a communication apparatus according to an embodiment of the present invention.

FIG. 11 illustrates a block diagram of a communication apparatus according to an embodiment of the present invention.

Specifically, FIG. 11 is a detail diagram of the UE of FIG. 10.

Referring to FIG. 11, the UE may include a processor (or digital signal processor (DSP) 1110, an RF module (or the RF unit) 1135, a power management module 1105, an antenna 1140, a battery 1155, a display 1115, a keypad 1120, memory 1130, a subscriber identification module (SIM) card 1125 (this element is optional), a speaker 1145 and a microphone 1150. The UE may further include a single antenna or multiple antennas.

The processor 1110 implements the functions, processes and/or methods proposed in FIGS. 1 to 9. The layers of a radio interface protocol may be implemented by the processor.

The memory 1130 is connected to the processor and stores information related to an operation of the processor. The memory may be positioned inside or outside the processor and may be connected to the processor by various well-known means.

A user inputs command information, such as a telephone number, by pressing (or touching) a button of the keypad 1120 or through voice activation using the microphone 1150, for example. The processor receives such command information and performs processing so that a proper function, such as making a phone call to the telephone number, is performed. Operational data may be extracted from the SIM card 1125 or the memory. Furthermore, the processor may recognize and display command information or driving information on the display 1115, for convenience sake.

The RF module 1135 is connected to the processor and transmits and/or receives RF signals. The processor delivers command information to the RF module so that the RF module transmits a radio signal that forms voice communication data, for example, in order to initiate communication. The RF module includes a receiver and a transmitter in order to receive and transmit radio signals. The antenna 1140 functions to transmit and receive radio signals. When a radio signal is received, the RF module delivers the radio signal so that it is processed by the processor, and may convert the signal into a baseband. The processed signal may be converted into audible or readable information output through the speaker 1145.

Figure 12:
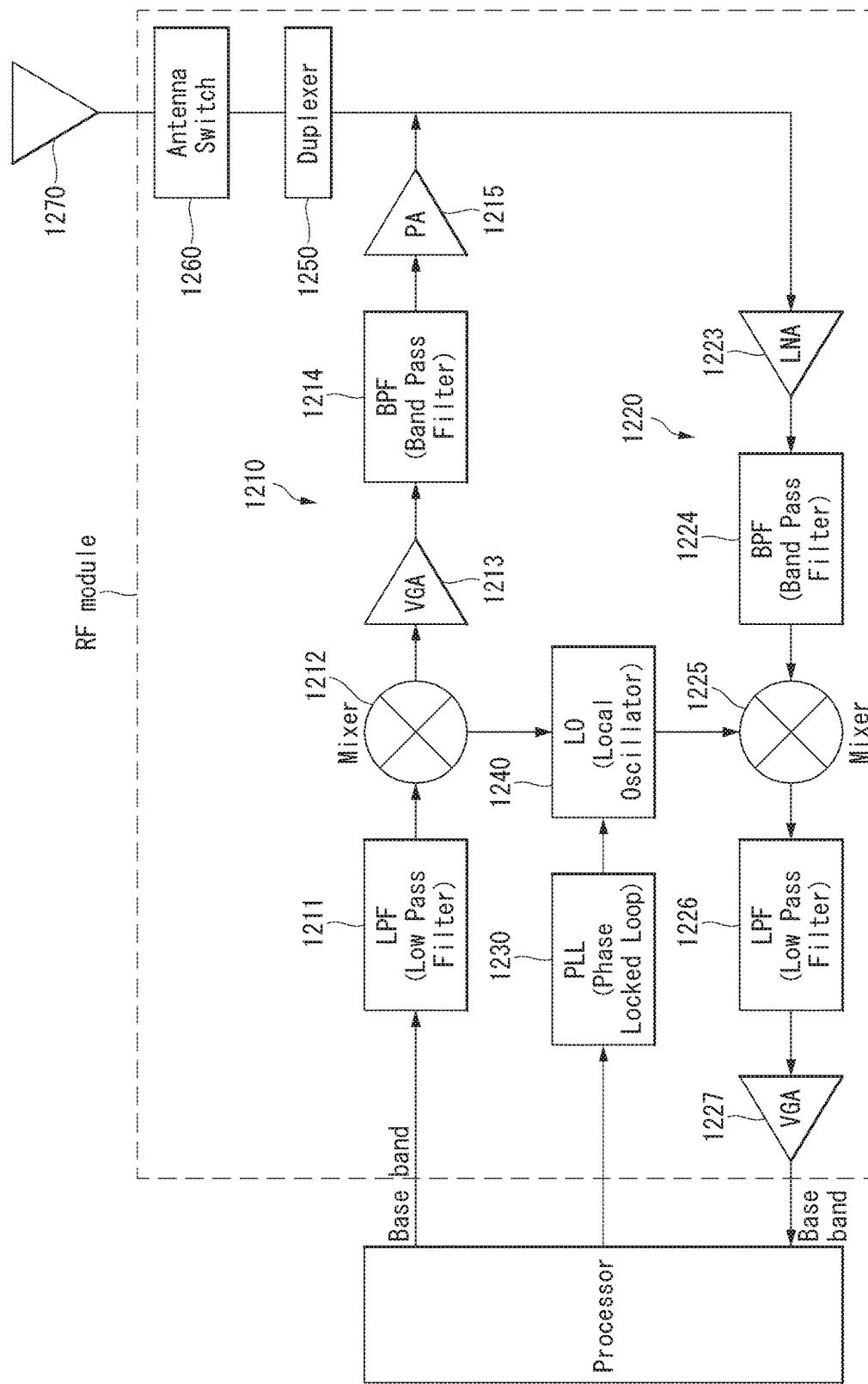
FIG. 12 is a diagram showing an example of the RF module of the wireless communication apparatus to which a method proposed in this specification may be applied.

FIG. 12 is a diagram showing an example of the RF module of the wireless communication apparatus to which a method proposed in this specification may be applied.

Specifically, FIG. 12 shows an example of an RF module that may be implemented in a frequency division duplex (FDD) system.

First, in a transmission path, the processor described in FIGS. 10 and 11 processes data to be transmitted and provides an analog output signal to a transmitter 1210.

In the transmitter 1210, the analog output signal is filtered by a low pass filter (LPF) 1211 in order to remove images caused by digital-to-analog conversion (ADC). The signal is up-converted from a baseband to an RF by a mixer 1212 and is amplified by a variable gain amplifier (VGA) 1213. The amplified signal is filtered by a filter 1214, additionally amplified by a power amplifier (PA) 1215, routed by a duplexer(s) 1250/antenna switch(es) 1260, and transmitted through an antenna 1270.

Furthermore, in a reception path, the antenna 1270 receives signals from the outside and provides the received signals. The signals are routed by the antenna switch(es) 1260/duplexers 1250 and provided to a receiver 1220.

In the receiver 1220, the received signals are amplified by a low noise amplifier (LNA) 1223, filtered by a band pass filter 1224, and down-converted from the RF to the baseband by a mixer 1225.

The down-converted signal is filtered by a low pass filter (LPF) 1226 and amplified by a VGA 1227, thereby obtaining the analog input signal. The analog input signal is provided to the processor described in FIGS. 10 and 11.

Furthermore, a local oscillator (LO) 1240 generates transmission and reception LO signals and provides them to the mixer 1212 and the mixer 1225, respectively.

Furthermore, a phase locked loop (PLL) 1230 receives control information from the processor in order to generate transmission and reception LO signals in proper frequencies, and provides control signals to the local oscillator 1240.

Furthermore, the circuits shown in FIG. 12 may be arrayed differently from the configuration shown in FIG. 12.

Figure 13:
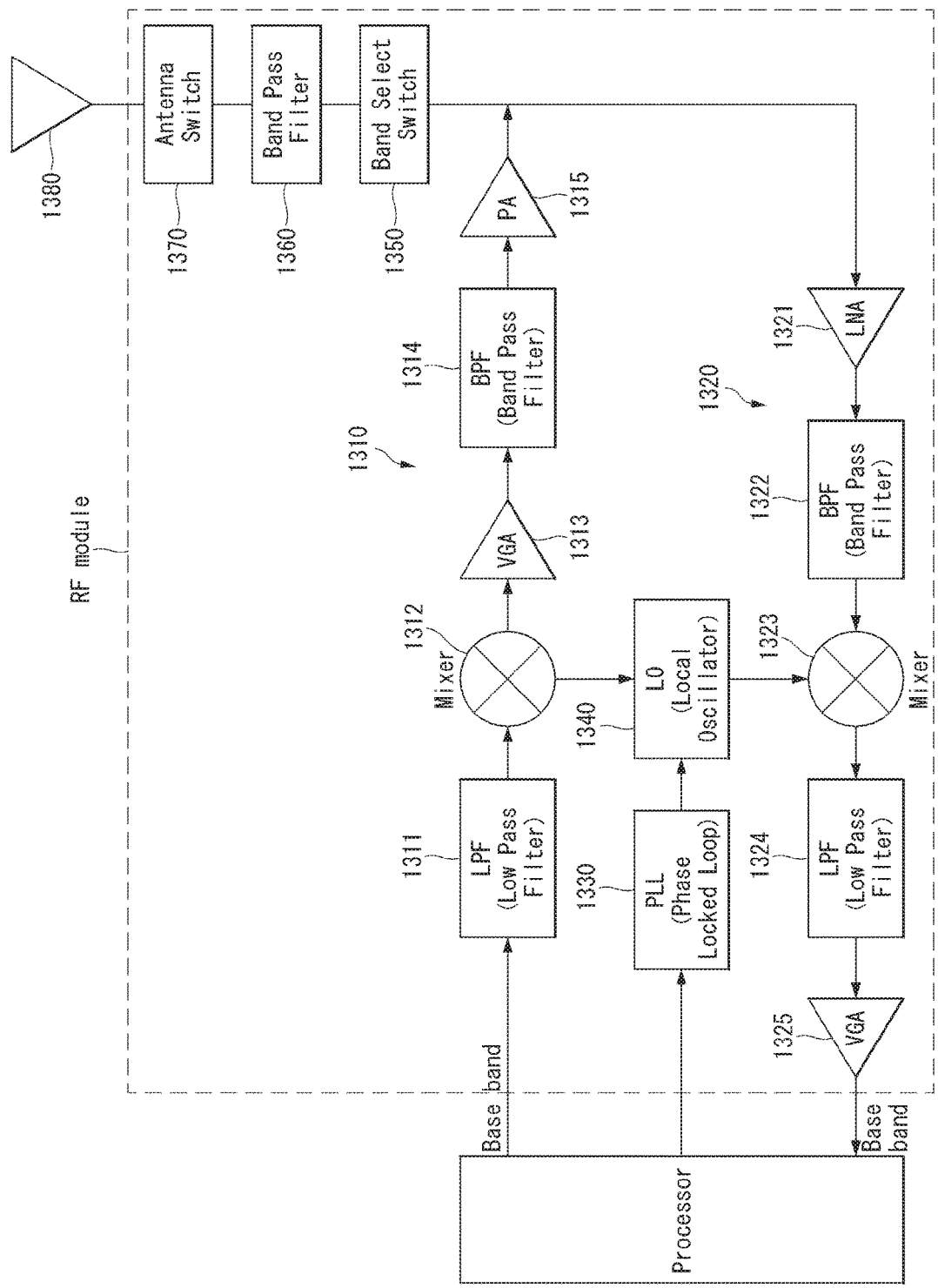
FIG. 13 is a diagram showing another example of the RF module of the wireless communication apparatus to which a method proposed in this specification may be applied.

FIG. 13 is a diagram showing another example of the RF module of the wireless communication apparatus to which a method proposed in this specification may be applied.

Specifically, FIG. 13 shows an example of an RF module that may be implemented in a time division duplex (TDD) system.

The transmitter 1310 and receiver 1320 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 12 for the same structure.

A signal amplified by the power amplifier (PA) 1315 of the transmitter is routed through a band select switch 1350, a band pass filter (BPF) 1360 and an antenna switch(es) 1370 and is transmitted through an antenna 1380.

Furthermore, in a reception path, the antenna 1380 receives signals from the outside and provides the received signals. The signals are routed through the antenna switch (es) 1370, the band pass filter 1360 and the band select switch 1350 and are provided to the receiver 1320.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

The method of transmitting an uplink signal in a wireless communication system according to the present invention has been described based on an example in which it is applied to the 3GPP LTE/LTE-A system and the 5G system (new RAT system), but may be applied to various wireless communication systems in addition to the 3GPP LTE/LTE-A system and the 5G system.

This specification has an advantage in that it can improve flexibility in designing a transmission antenna in a UE by increasing the degree of freedom for antenna port selection through a codebook configuration for 1-port selection.

Effects which may be obtained by the present invention are not limited to the aforementioned effects, and various other effects may be evidently understood by those skilled in the art to which the present invention pertains from the following description.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

What is claimed is:

1. A method of transmitting, by a user equipment (UE), an uplink signal based on a codebook in a wireless communication system, the method comprising:
   receiving, from a base station, downlink control information (DCI) including a first transmit precoding matrix indicator (TPMI);
   based on the first TPMI, determining a first precoding matrix related to a transmission of the uplink signal; and transmitting, to the base station, the uplink signal based on the first precoding matrix,
wherein a codebook for a single layer using four antenna ports includes the first precoding matrix,
wherein the first precoding matrix is a precoding matrix for selecting one antenna port, and
wherein the first precoding matrix is $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix} \text{ or } \frac{1}{2}\begin{bmatrix}0\\0\\0\\1\end{bmatrix}.$$

2. The method of claim 1, wherein the codebook for the single layer using the four antenna ports includes a codebook based on discrete Fourier transform spread orthogonal frequency division multiplexing (DFT-s-OFDM).

3. The method of claim 1, wherein the DCI further includes a second TPMI related to port combining of an antenna port selected based on the first TPMI.

4. The method of claim 3, wherein a size of the second TPMI is determined based on a size of the first TPMI.

5. The method of claim 4, wherein:
the first TPMI is represented as an X-bitmap, and
a value of the X is a number of antenna ports.

6. The method of claim 1, further comprising:
receiving, from the base station, a signaling including a power scaling factor to be applied to the first precoding matrix; and
applying the power scaling factor to the first precoding matrix.

7. The method of claim 6, wherein the power scaling factor is configured by considering a capability of the UE.

8. The method of claim 1, wherein the first TPMI includes a wideband TPMI.

9. A user equipment (UE) configured to transmit an uplink signal based on a codebook in a wireless communication system, the UE comprising:
a transceiver configured to transmit and receive radio signals; and
a processor functionally connected to the transceiver, wherein the processor is configured to:
receive, from a base station, downlink control information (DCI) including a first transmit precoding matrix indicator (TPMI),
based on the first TPMI, determine a first precoding matrix related to a transmission of the uplink signal, and
transmit, to the base station, the uplink signal based on the first precoding matrix,
wherein a codebook for a single layer using four antenna ports includes the first precoding matrix,
wherein the first precoding matrix is a precoding matrix for selecting one antenna port, and
wherein the first precoding matrix is $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix} \text{ or } \frac{1}{2}\begin{bmatrix}0\\0\\0\\1\end{bmatrix}.$$

10. The UE of claim 9, wherein the codebook for the single layer using the four antenna ports includes a codebook based on discrete Fourier transform spread orthogonal frequency division multiplexing (DFT-s-OFDM).

11. The UE of claim 9, wherein the DCI further includes a second TPMI related to port combining of an antenna port selected based on the first TPMI.

12. The UE of claim 9, wherein the first TPMI includes a wideband TPMI.

13. A base station configured to receive an uplink signal based on a codebook in a wireless communication system, the base station comprising:
a transceiver configured to transmit and receive radio signals; and
a processor functionally connected to the transceiver, wherein the processor is configured to:
transmit, to a user equipment (UE), downlink control information (DCI) including a first transmit precoding matrix indicator (TPMI), and
receive, from the UE, the uplink signal based on a first precoding matrix,
wherein the first precoding matrix is determined based on the first TPMI,
wherein a codebook for a single layer using four antenna ports includes the first precoding matrix,
wherein the first precoding matrix is a precoding matrix for selecting one antenna port, and
wherein the first precoding matrix is $$\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix} \text{ or } \frac{1}{2}\begin{bmatrix}0\\0\\0\\1\end{bmatrix}.$$

14. The base station of claim 13, wherein the codebook for the single layer using the four antenna ports includes a codebook based on discrete Fourier transform spread orthogonal frequency division multiplexing (DFT-s-OFDM).

15. The base station of claim 13, wherein the DCI further includes a second TPMI related to port combining of an antenna port selected based on the first TPMI.

16. The base station of claim 13, wherein the first TPMI includes a wideband TPMI.

* * * * *